(12) United States Patent
Apaydin et al.

(10) Patent No.: US 9,601,824 B2
(45) Date of Patent: Mar. 21, 2017

(54) SLOT ANTENNA INTEGRATED INTO A RESONANT CAVITY OF AN ELECTRONIC DEVICE CASE

(71) Applicant: Microsoft Corporation, Redmond, WA (US)

(72) Inventors: Nil Apaydin, Redmond, WA (US); Paul O'Brien, Sammamish, WA (US); Javier R. De Luis, Kirkland, WA (US); Ben Shewan, Redmond, WA (US); Alireza Mahanfar, Bellevue, WA (US); Sidharath Jain, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

(21) Appl. No.: 14/517,666

(22) Filed: Oct. 17, 2014

(65) Prior Publication Data

US 2016/0006109 A1    Jan. 7, 2016

Related U.S. Application Data

(60) Provisional application No. 62/019,692, filed on Jul. 1, 2014.

(51) Int. Cl.
*H01Q 1/24* (2006.01)
*H01Q 1/27* (2006.01)
(Continued)

(52) U.S. Cl.
CPC ............ *H01Q 1/273* (2013.01); *G04G 21/04* (2013.01); *G04R 60/08* (2013.01); *G06F 1/163* (2013.01);
(Continued)

(58) Field of Classification Search
CPC .......... H01Q 1/273; H01Q 1/48; H01Q 13/10; G06F 1/163
See application file for complete search history.

(56) References Cited

U.S. PATENT DOCUMENTS

| 4,754,285 A | 6/1988 | Robitaille |
| 4,821,040 A * | 4/1989 | Johnson ............... H01Q 1/3275 343/700 MS |

(Continued)

FOREIGN PATENT DOCUMENTS

| EP | 2405534 A1 | 1/2012 |
| GB | 2516304 A | 1/2015 |

(Continued)

OTHER PUBLICATIONS

International Searching Authority, U. S. Patent and Trademark Office, International Search Report for PCT US2015/055408 dated Nov. 19, 2015, 5 pages.

(Continued)

*Primary Examiner* — Trinh Dinh
(74) *Attorney, Agent, or Firm* — Holzer Patel Drennan

(57) ABSTRACT

An electronic device case includes a conductive cap section and a conductive bezel section forming a perimeter outside the conductive cap section and separated from the conductive cap section by a bezel gap. A conductive ground plane section forms a perimeter and is positioned opposite the conductive cap section and the conductive bezel section. The conductive ground plane section is separated from the conductive bezel section by a perimeter gap. One or more components reside between the conductive cap section and the conductive ground plane section forming a resonant cavity including a ground plane resonant cavity portion between the one or more components and the conductive ground plane section and a substantially annular resonant (Continued)

cavity portion between the one or more components and the perimeters of the conductive bezel section and the conductive ground plane section.

20 Claims, 24 Drawing Sheets

(51) Int. Cl.

| | |
|---|---|
| G06F 1/16 | (2006.01) |
| H01Q 1/48 | (2006.01) |
| H01Q 13/10 | (2006.01) |
| H01Q 1/36 | (2006.01) |
| H01Q 13/18 | (2006.01) |
| G04R 60/08 | (2013.01) |
| G04G 21/04 | (2013.01) |
| H01Q 5/328 | (2015.01) |
| H01Q 5/392 | (2015.01) |

(52) U.S. Cl.
CPC .................. *H01Q 1/36* (2013.01); *H01Q 1/48* (2013.01); *H01Q 5/328* (2015.01); *H01Q 13/10* (2013.01); *H01Q 13/18* (2013.01); *H01Q 5/392* (2015.01)

(56) References Cited

U.S. PATENT DOCUMENTS

| | | | | |
|---|---|---|---|---|
| 4,994,817 | A | * | 2/1991 | Munson ................. H01Q 13/18 343/746 |
| 5,194,876 | A | * | 3/1993 | Schnetzer .............. H01Q 13/18 343/746 |
| 5,621,419 | A | | 4/1997 | Meek et al. |
| 5,757,326 | A | | 5/1998 | Koyama et al. |
| 5,798,984 | A | | 8/1998 | Koch |
| 5,926,144 | A | | 7/1999 | Bolanos et al. |
| 5,995,058 | A | * | 11/1999 | Legay .................... H01Q 1/521 343/700 MS |
| 6,008,772 | A | * | 12/1999 | Legay ...................... H01Q 1/38 343/700 MS |
| 6,034,645 | A | * | 3/2000 | Legay .................. H01Q 9/0464 343/767 |
| 6,212,414 | B1 | | 4/2001 | Alameh et al. |
| 6,950,685 | B2 | | 9/2005 | Barras et al. |
| 7,230,885 | B2 | | 6/2007 | Sakurazawa et al. |
| 7,271,774 | B2 | | 9/2007 | Puuri |
| 7,714,790 | B1 | | 5/2010 | Feldstein et al. |
| 8,169,374 | B2 | | 5/2012 | Hill et al. |
| 8,253,640 | B2 | | 8/2012 | Kitayoshi et al. |
| 8,270,914 | B2 | | 9/2012 | Pascolini et al. |
| 8,556,168 | B1 | | 10/2013 | Lewis et al. |
| 8,599,088 | B2 | | 12/2013 | Chiang et al. |
| 8,833,665 | B2 | | 9/2014 | Grange et al. |
| 2003/0117903 | A1 | | 6/2003 | Nakajima et al. |
| 2005/0219955 | A1 | | 10/2005 | Xu et al. |
| 2007/0046543 | A1 | | 3/2007 | Choi et al. |
| 2008/0165071 | A1 | | 7/2008 | Chiang et al. |
| 2011/0013491 | A1 | | 1/2011 | Fujisawa |
| 2011/0234461 | A1 | | 9/2011 | Grange et al. |
| 2011/0241948 | A1 | | 10/2011 | Bevelacqua et al. |
| 2012/0256808 | A1 | | 10/2012 | Owens |
| 2013/0016016 | A1 | | 1/2013 | Lin et al. |
| 2013/0101005 | A1 | | 4/2013 | Aryanfar |
| 2013/0109305 | A1 | | 5/2013 | Savoj et al. |
| 2013/0127673 | A1 | | 5/2013 | Chang et al. |
| 2013/0135158 | A1 | | 5/2013 | Faraone et al. |
| 2013/0225070 | A1 | | 8/2013 | Lin |
| 2013/0249753 | A1 | | 9/2013 | Asanuma et al. |
| 2013/0342407 | A1 | | 12/2013 | Kvist et al. |
| 2014/0139637 | A1 | | 5/2014 | Mistry et al. |
| 2014/0225786 | A1 | | 8/2014 | Lyons et al. |
| 2014/0266624 | A1 | | 9/2014 | Van Bosch et al. |
| 2014/0266920 | A1 | | 9/2014 | Tran et al. |
| 2014/0354494 | A1 | | 12/2014 | Katz |
| 2015/0009075 | A1 | | 1/2015 | Lau et al. |
| 2015/0048979 | A1 | | 2/2015 | Asrani et al. |
| 2015/0109172 | A1 | | 4/2015 | Iijima et al. |
| 2015/0349410 | A1 | * | 12/2015 | Russell .................. G04G 21/04 343/702 |
| 2016/0006110 | A1 | | 1/2016 | Jain et al. |

FOREIGN PATENT DOCUMENTS

| | | |
|---|---|---|
| JP | H9247006 A | 9/1997 |
| JP | 2004032303 A | 1/2004 |
| WO | 2013132715 A1 | 9/2013 |
| WO | 2013188977 A2 | 12/2013 |
| WO | 2015053535 A1 | 4/2015 |

OTHER PUBLICATIONS

International Searching Authority, U.S. Patent and Trademark Office, Written Opinion for PCT US2015/055408, mailed Nov. 27, 2015, 8 pages.

Stevens, Tim, "Pebble Steel Declassified: Raising the Smartwatch Design Bar without Breaking the Mold", Published on: Jan. 6, 2014 Available at: http://www.cnet.com/news/pebble-steel-declassified-raising-the-smartwatch-design-bar-without-breaking-the-mold/.

"Fenix 3", Published on: Jan. 22, 2015 Available at: http://fenix3.garmin.com/en-US/.

Zhang, et al., "Integrated Dual-Band Antenna System Design Incorporating Cell Phone Bezel", In Journal of IEEE Antennas and Wireless Propagation Letters, vol. 7, May 16, 2008, pp. 585-587.

Stern, Becky, "Inside the Moto 360", Retrieved on: Jan. 22, 2015 Available at: https://learn.adafruit.com/moto-360-smartwatch-teardown/inside-the-moto-360.

"Real World NFC Antenna", Published on: Sep. 1, 2013 Available at: http://www.antenna-theory.com/definitions/nfc-antenna.php.

International Searching Authority, U.S. Patent and Trademark Office, International Search Report, dated Sep. 29, 2015, 5 pages.

International Searching Authority, U.S. Patent and Trademark Office, Written Opinion, mailed date Oct. 6, 2015, 7 pages.

Haga, et al., "A Cavity-Backed Slot Antenna for On-Body BAN Devices", In Proceedings of International Workshop on Antenna Technology: Small Antennas and Novel Metamaterials, Mar. 4, 2008, pp. 510-513.

Non-Final Office Action issued in U.S. Appl. No. 14/517,707, dated Feb. 2, 2016, 11 pages.

Non-Final Office Action issued in U.S. Appl. No. 14/517,707, dated Aug. 9, 2016, 12 pages.

International Searching Authority, U. S. Patent and Trademark Office, Second Written Opinion for PCT/US2015/055408 dated Sep. 20, 2017, 7 pages.

"International Search Report and Written Opinion Issued in PCT Application No. PCT/US2016/044948", Mailed Date: Nov. 2, 2016, 12 Pages.

* cited by examiner

SLOT ANTENNA INTEGRATED INTO A RESONANT CAVITY OF AN ELECTRONIC DEVICE CASE

CROSS-REFERENCE TO RELATED APPLICATION

The present application claims benefit of priority to U.S. Provisional Patent Application No. 62/019,692, entitled "Tunable Slot Antenna Integrated into a Resonant Cavity of an Electronic Device Case" and filed on Jul. 1, 2014, which is specifically incorporated by reference herein for all that it discloses and teaches.

The present application is also related to U.S. patent application Ser. No. 14/517,707, entitled "Structural Tank Integrated into an Electronic Device Case" and filed concurrently herewith, which is specifically incorporated by reference herein for all that it discloses and teaches.

BACKGROUND

Wearable electronic devices are becoming popular in consumer electronics. Such devices may include one or more antennas designed to operate on a lossy human body. One challenge in the design of antennas for wearable electronic devices is that the antenna efficiency degrades when the antenna is in close proximity to lossy human body tissue.

SUMMARY

An electronic device case includes a conductive cap section and a conductive bezel section forming a perimeter outside the conductive cap section and separated from the conductive cap section by a bezel gap. A conductive ground plane section forms a perimeter and is positioned opposite the conductive cap section and the conductive bezel section. The conductive ground plane section is separated from the conductive bezel section by a perimeter gap. One or more components reside between the conductive cap section and the conductive ground plane section forming a resonant cavity including a ground plane resonant cavity portion between the one or more components and the conductive ground plane section and a substantially annular resonant cavity portion between the one or more components and the perimeters of the conductive bezel section and the conductive ground plane section.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

The described technology provides multiple implementations of a tunable slot antenna integrated into a resonant cavity of an electronic device case. In an implementation, a triple frequency band slot antenna design excites the characteristic modes of the metallic antenna elements in the electronic device and/or case structure. In another implementation, a five band slot antenna design is provided. Other implementations may provide more frequency bands or fewer frequency bands of operation. In an implementation, human tissue (e.g., a wearer's wrist) increases the ground plane effect and acts as a reflector at lower frequency bands to maintain the antenna performance relative to or close to the lossy tissue.

Figure 1:
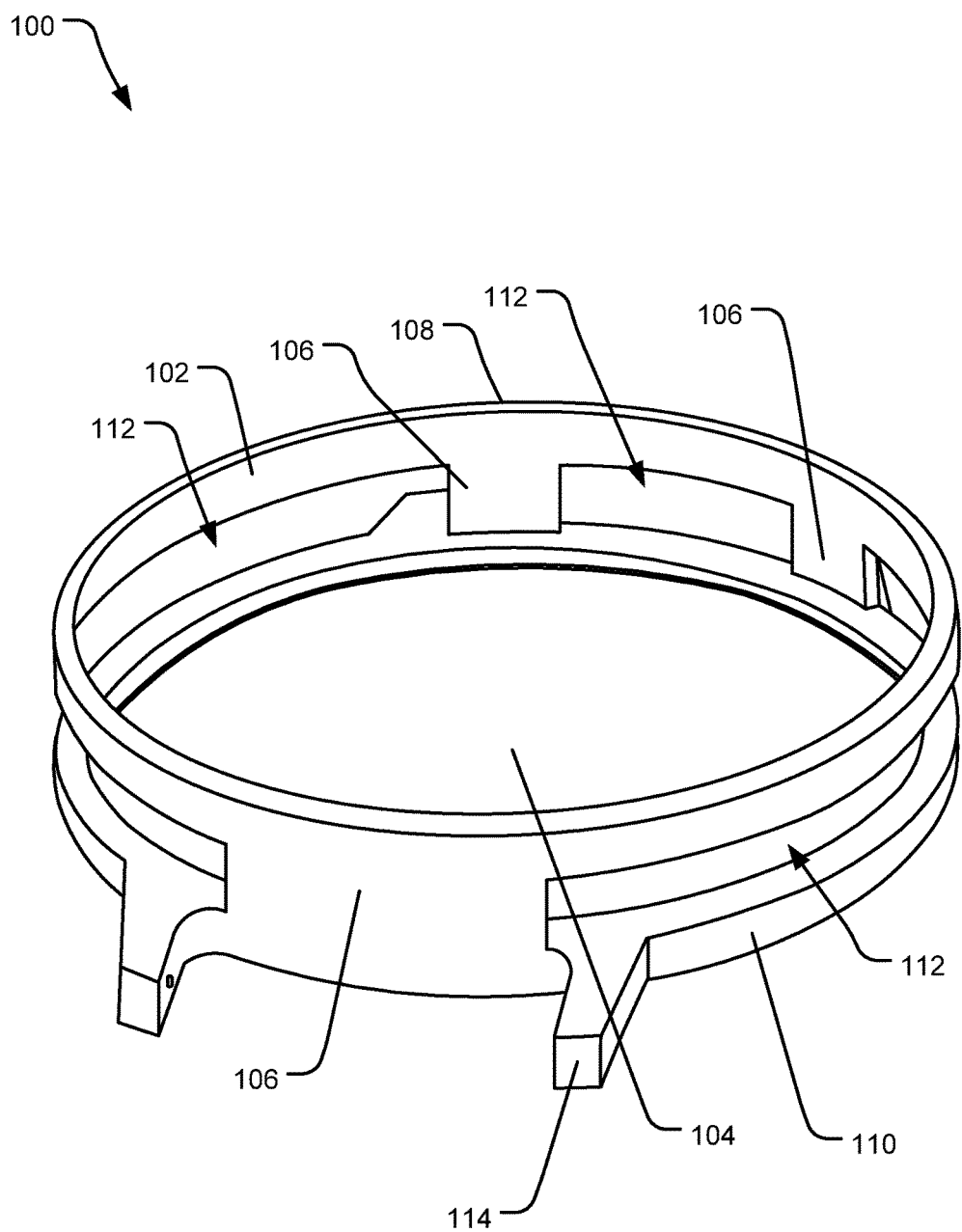
FIG. 1 illustrates a perspective view of an example tunable slot antenna integrated into a resonant cavity of an electronic device case.

FIG. 1 illustrates a perspective view of an example tunable slot antenna integrated into a resonant cavity of an electronic device case 100. A conductive bezel section 102 of the electronic device case 100 is connected to a conductive ground plane section 104 via one or more perimeter slot gap shorts 106. The conductive bezel section 102 has a perimeter 108, and the conductive ground plane section 104 has a perimeter 110. A separation between the conductive bezel section 102 and the conductive ground plane section 104 forms a gap including one or more slots 112 of a slot antenna configuration. The positions and radial lengths of the perimeter slot gap shorts 106 are tuned to one or more frequency band resonances. The electronic device case 100 is illustrated as including fixtures 114 for attaching a watchband, although other electronic devices may be employed, including without limitation necklaces and other wearable devices.

Figure 2:
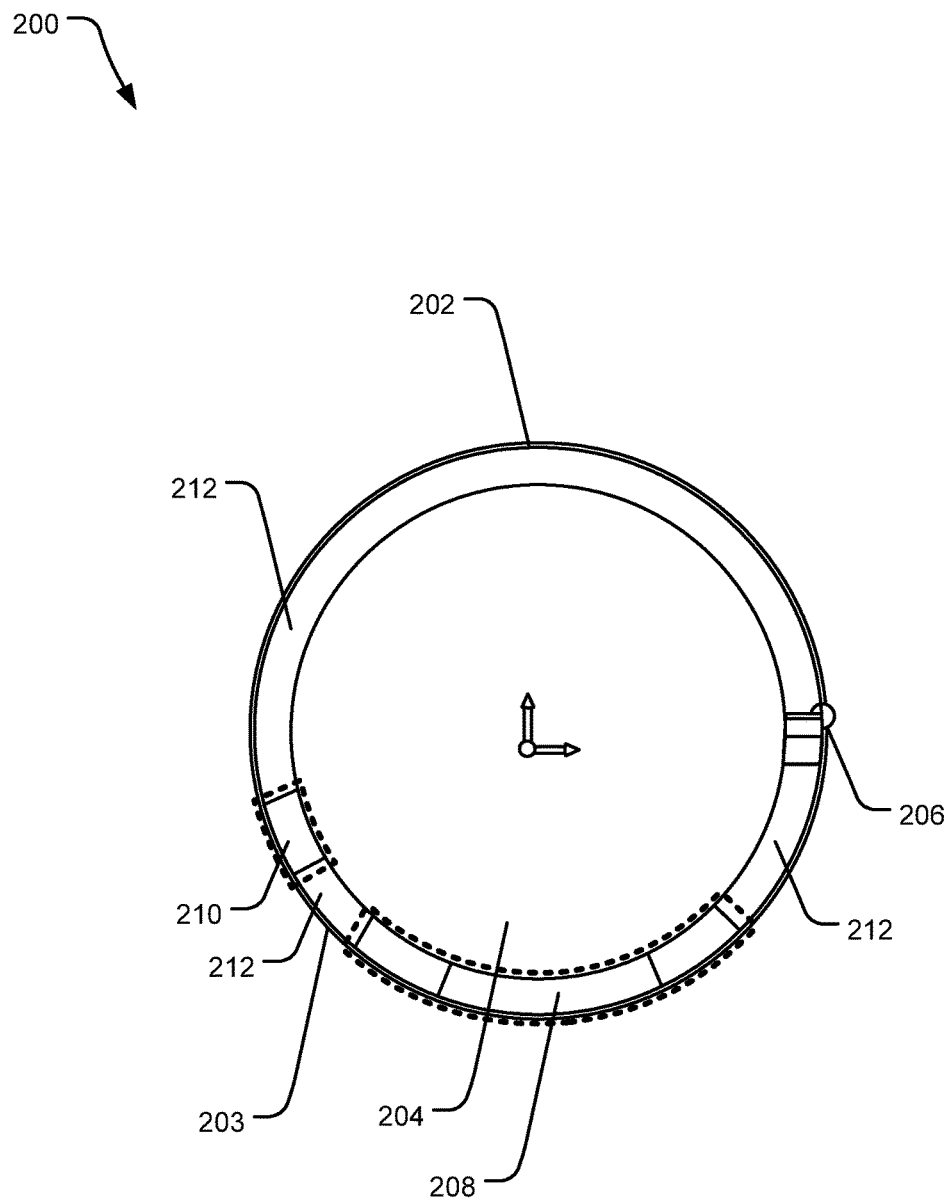
FIG. 2 illustrates a plan view of an example tunable slot antenna integrated into a resonant cavity having a radio frequency feed between a conductive bezel section and a conductive ground plane section of an electronic device case.

FIG. 2 illustrates a plan view of an example tunable slot antenna integrated into a resonant cavity having a radio frequency feed 206 between a conductive bezel section 202 and a conductive ground plane section of an electronic device case 200. The conductive bezel section 202 has a perimeter 203, which is shown as circular but which may be of any shape including without limitation oval, triangular, rectangular, hexagonal, octagonal, etc. A conductive cap section 204 is surrounded by the conductive bezel section 202 and is separated from the conductive bezel section 202 by a gap. The conductive cap section 204 is also connected to the conductive bezel section 202 by two bezel slot gap shorts 208 (low band) and 210 (high band) to form bezel slots 212. The conductive bezel section 202 is also connected to the conductive ground plane section by two perimeter slot gap shorts to form perimeter slots. The positions and radial (i.e., along the perimeter) lengths of the bezel slot gap shorts 208 and 210 and perimeter slot gap shorts (not shown) are tuned to one or more frequency band resonances.

Figure 3:
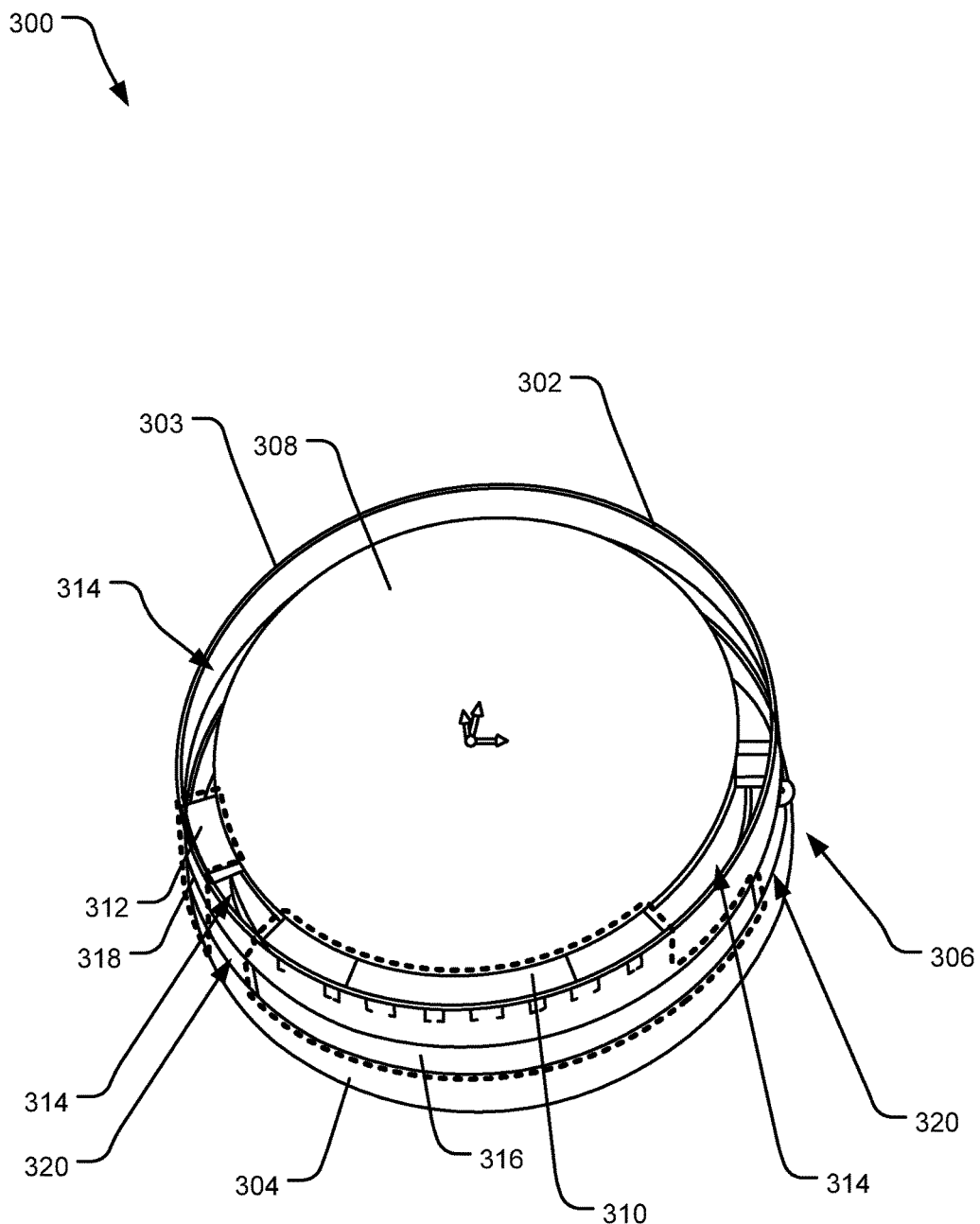
FIG. 3 illustrates a perspective view of an example tunable slot antenna integrated into a resonant cavity having a radio frequency feed between a conductive bezel section and a conductive ground plane section of an electronic device case.

FIG. 3 illustrates a perspective view of an example tunable slot antenna integrated into a resonant cavity having a radio frequency feed 306 between a conductive bezel section 302 and a conductive ground plane section 304 of an electronic device case 300. The conductive bezel section 302 has a perimeter 303, which is shown as circular but which may be of any shape including without limitation oval, triangular, rectangular, hexagonal, octagonal, etc. A conductive cap section 308 is surrounded by the conductive bezel section 302 and is separated from the conductive bezel section 302 by a gap. The conductive cap section 308 is also connected to the conductive bezel section 302 by two or more bezel slot gap shorts 310 (low band) and 312 (high band) to form bezel slots 314. The conductive bezel section 302 is also connected to the conductive ground plane section 304 by two or more perimeter slot gap shorts 316 (low band) and 318 (high band) to form bezel slots 320. The positions and radial lengths of the bezel slot gap shorts 310 and 312 and perimeter slot gap shorts 316 and 318 are tuned to one or more frequency band resonances.

Figure 4:
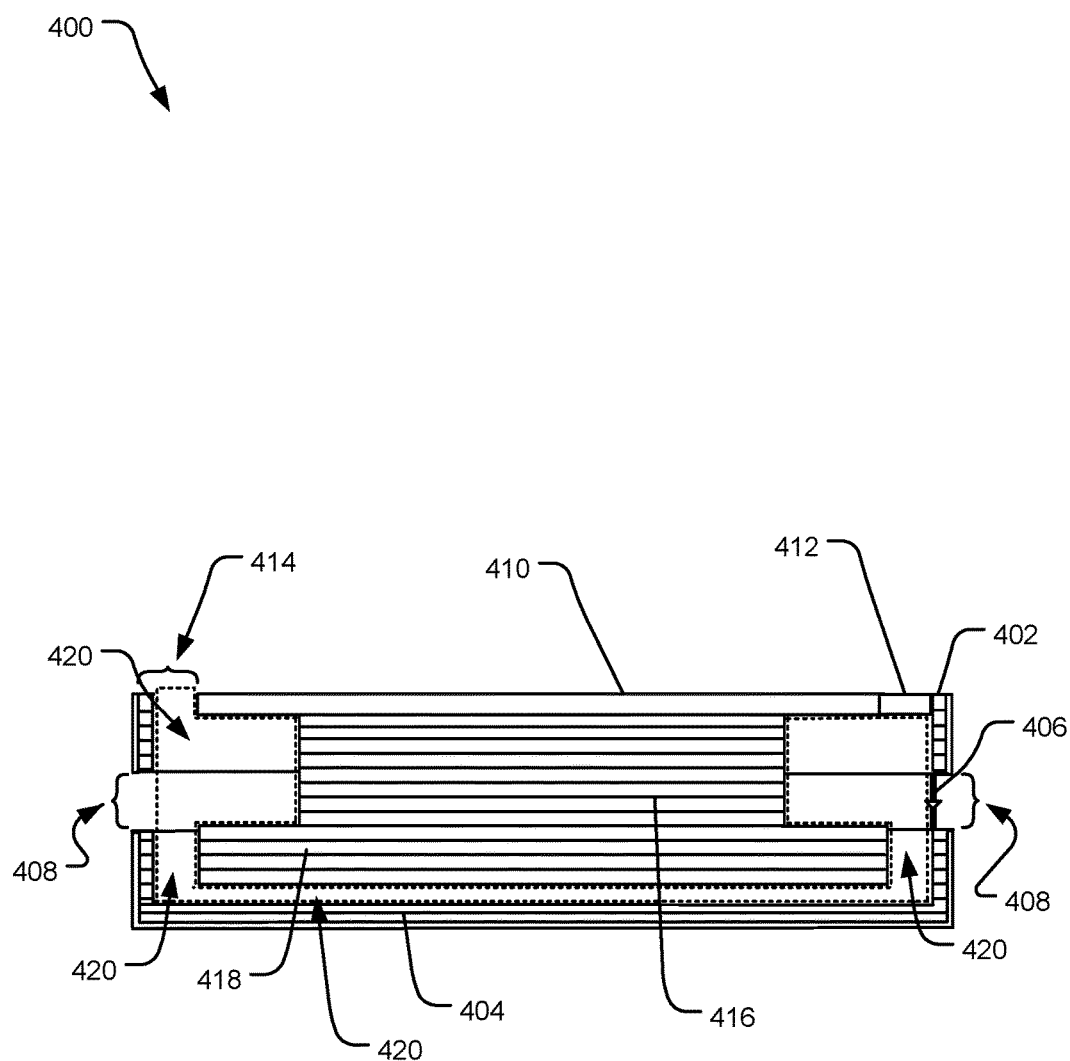
FIG. 4 illustrates a cross-sectional side view of an example tunable slot antenna integrated into a resonant cavity having a radio frequency feed between a conductive bezel section and a conductive ground plane section of an electronic device case.

FIG. 4 illustrates a cross-sectional side view of an example tunable slot antenna integrated into a resonant cavity having a radio frequency feed 406 between a conductive bezel section 402 and a conductive ground plane section 404 of an electronic device case 400. The conductive bezel section 402 and the conductive ground plane section 404 are positioned substantially parallel to each other, forming a perimeter gap, and are connected by two or more perimeter slot gap shorts (not shown). The perimeter slot gap shorts divide the perimeter gap into two or more resonant perimeter slots 408. The positions and radial lengths of the perimeter slot gap shorts are tuned to one or more frequency band resonances.

A conductive cap section 410 is positioned within the perimeter of the conductive bezel section 402, separated from the conductive bezel section 402 by a bezel gap. The conductive cap section 410 is connected to the conductive bezel section 402 by two or more bezel slot gap shorts 412 to form two or more bezel slots 414. The positions and radial lengths of the bezel slot gap shorts 412 are tuned to one or more frequency band resonances.

As shown, the conductive cap section 410 is formed as a display panel, covered by a transparent or translucent view panel, although other conductive cap sections may be employed. Other components of the electronic device case 400, including one or more plastic housing elements, air, a battery 416 and a printed circuit board (PCB) 418, form a resonant cavity 420 depicted by dashed lines within the electronic device case 400. In FIG. 4, the resonant cavity 420 extends along the surface of the conductive ground plane section 404 and then substantially parallel to the perimeters of the conductive bezel section 402 and the conductive ground plane section 404. The radio frequency feed 406 connects the conductive bezel section 402 to the conductive ground plane section 404.

Figure 5:
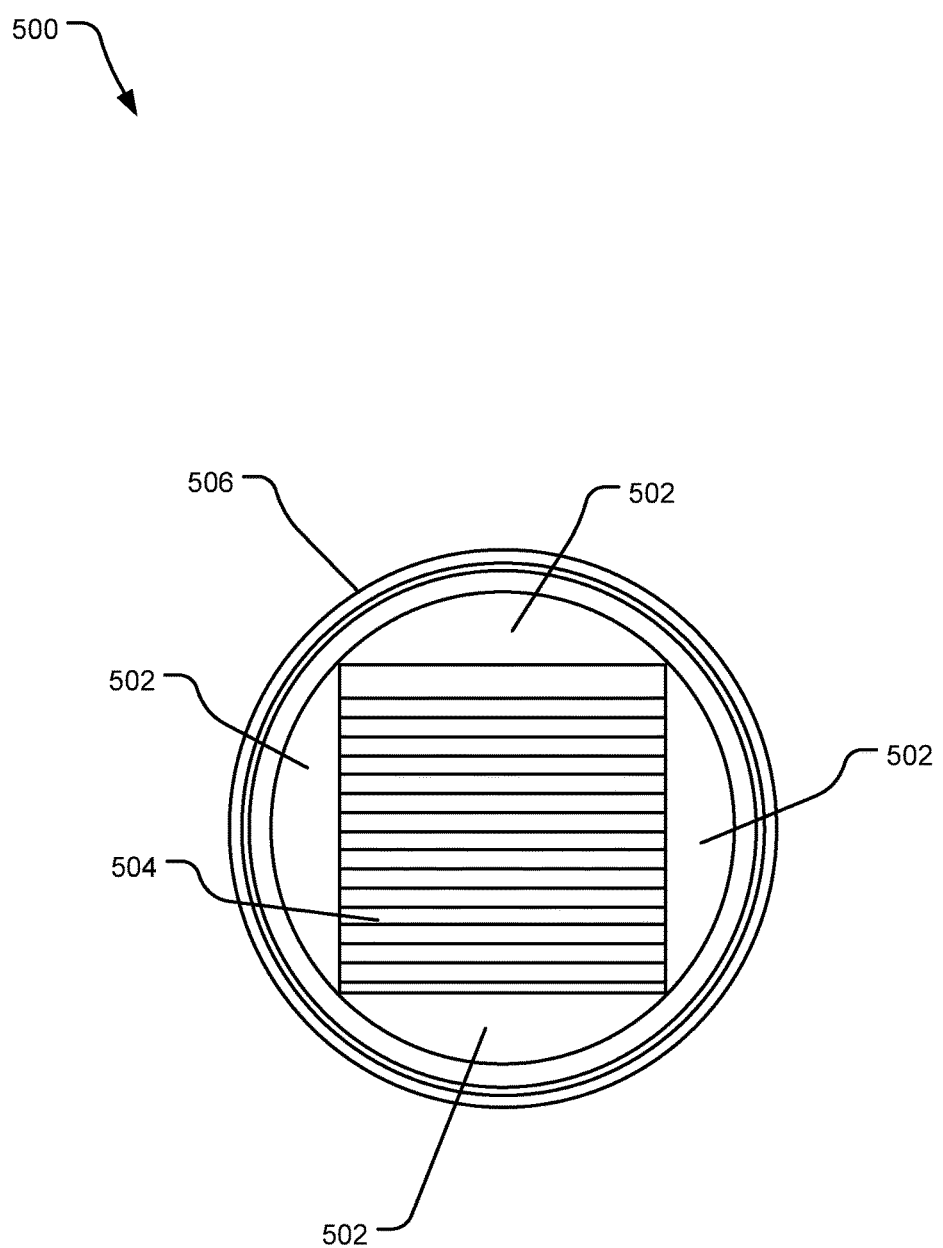
FIG. 5 illustrates a cross-sectional top view of an example tunable slot antenna integrated into a resonant cavity of an electronic device case.

FIG. 5 illustrates a cross-sectional top view of an example tunable slot antenna integrated into a resonant cavity 502 of an electronic device case 500. An example component, a battery 504, is shown within a conductive bezel section 506 of the electronic device case 500, forming part of the resonant cavity 502 between the component and the conductive bezel section 506.

Figure 6:
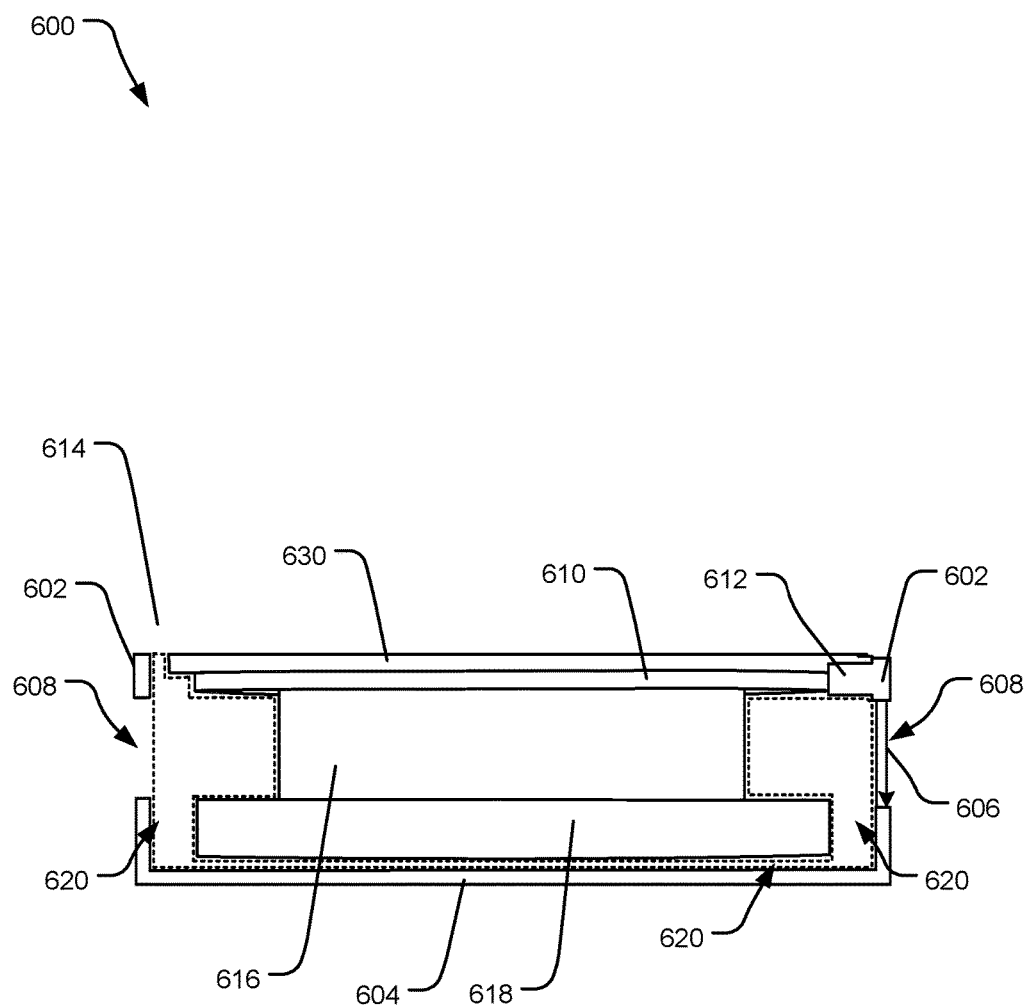
FIG. 6 illustrates a schematic side view of an example tunable slot antenna integrated into a resonant cavity having a radio frequency feed between a conductive bezel section and a conductive ground plane section of an electronic device case.

FIG. 6 illustrates a schematic side view of an example tunable slot antenna integrated into a resonant cavity having a radio frequency feed 606 between a conductive bezel section 602 and a conductive ground plane section 604 of an electronic device case 600. The conductive bezel section 602 and the conductive ground plane section 604 are positioned substantially parallel to each other, forming a perimeter gap, and are connected by two or more perimeter slot gap shorts (not shown). The perimeter slot gap shorts divide the perimeter gap into two or more resonant perimeter slots 608. The positions and radial lengths of the perimeter slot gap shorts are tuned to one or more frequency band resonances.

A conductive cap section 610 is positioned within the perimeter of the conductive bezel section 602, separated from the conductive bezel section 602 by a bezel gap. The conductive cap section 610 is connected to the conductive bezel section 602 by two or more bezel slot gap shorts 612 to form two or more bezel slots 614. The positions and radial lengths of the bezel slot gap shorts 612 are tuned to one or more frequency band resonances.

As shown, the conductive cap section 610 is formed as a display panel, covered by a transparent or translucent view panel 630, although other conductive cap sections may be employed. Other components of the electronic device case 600, including one or more plastic housing elements, air, a battery 616 and a printed circuit board (PCB) 618, form a resonant cavity 620 depicted by dashed lines within the electronic device case 600. In FIG. 6, the resonant cavity 620 extends along the surface of the conductive ground plane section 604 and then substantially parallel to the perimeters of the conductive bezel section 602 and the conductive ground plane section 604. The radio frequency feed 606 connects the conductive bezel section 602 to the conductive ground plane section 604.

Figure 7:
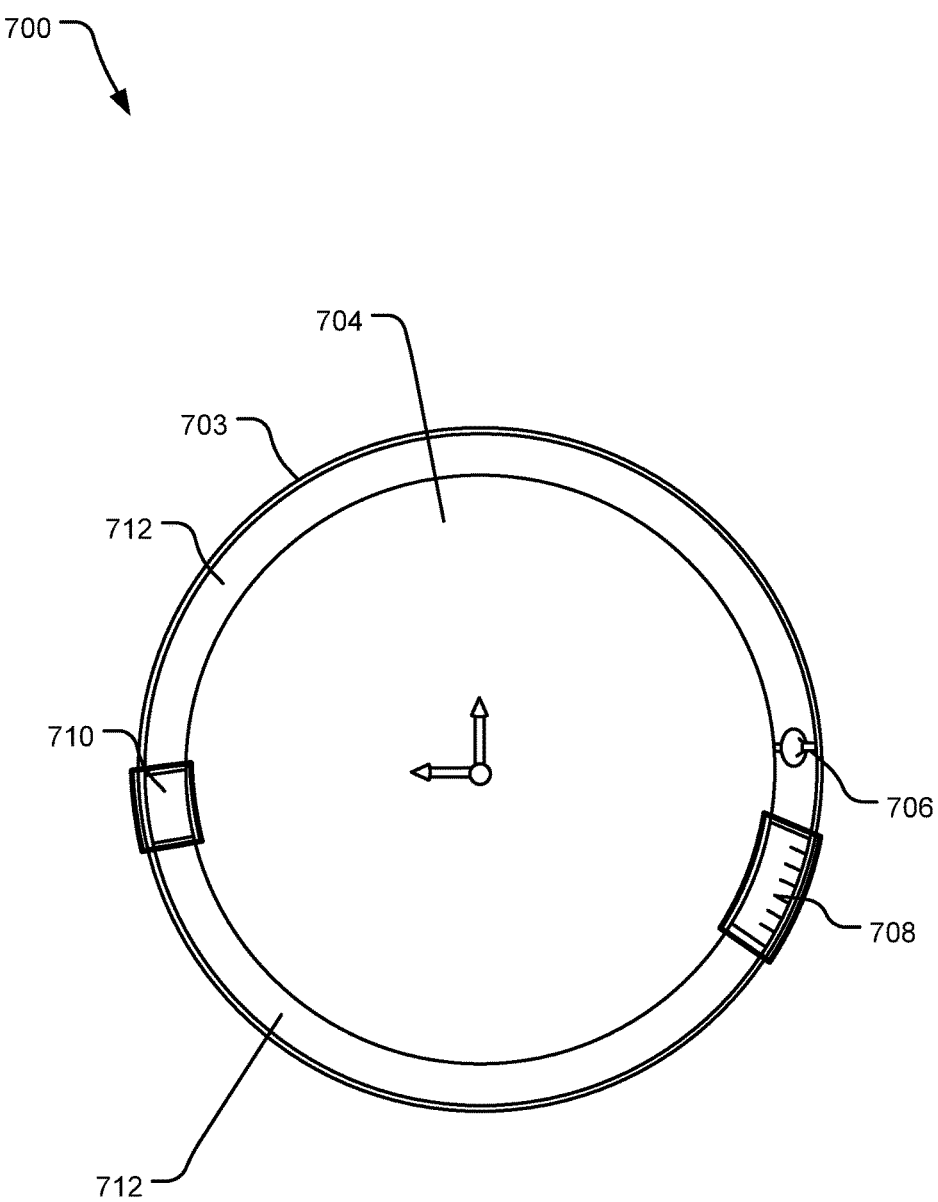
FIG. 7 illustrates a plan view of an example tunable slot antenna integrated into a resonant cavity having a radio frequency feed between a conductive bezel section and a printed circuit board of an electronic device case.

FIG. 7 illustrates a plan view of an example tunable slot antenna integrated into a resonant cavity having a radio frequency feed 706 between a conductive bezel section 702 and a printed circuit board of an electronic device case 700. The conductive bezel section 702 has a perimeter 703, which is shown as circular but which may be of any shape including without limitation oval, triangular, rectangular, hexagonal, octagonal, etc. A conductive cap section 704 is surrounded by the conductive bezel section 702 and is separated from the conductive bezel section 702 by a gap. The conductive cap section 704 is also connected to the conductive bezel section 702 by two bezel slot gap shorts 708 (low band) and 710 (high band) to form bezel slots 712. The conductive bezel section 702 is also connected to the conductive ground plane section by two perimeter slot gap shorts to form perimeter slots. The positions and radial (i.e., along the perimeter) lengths of the bezel slot gap shorts 708 and 710 and perimeter slot gap shorts (not shown) are tuned to one or more frequency band resonances.

Figure 8:
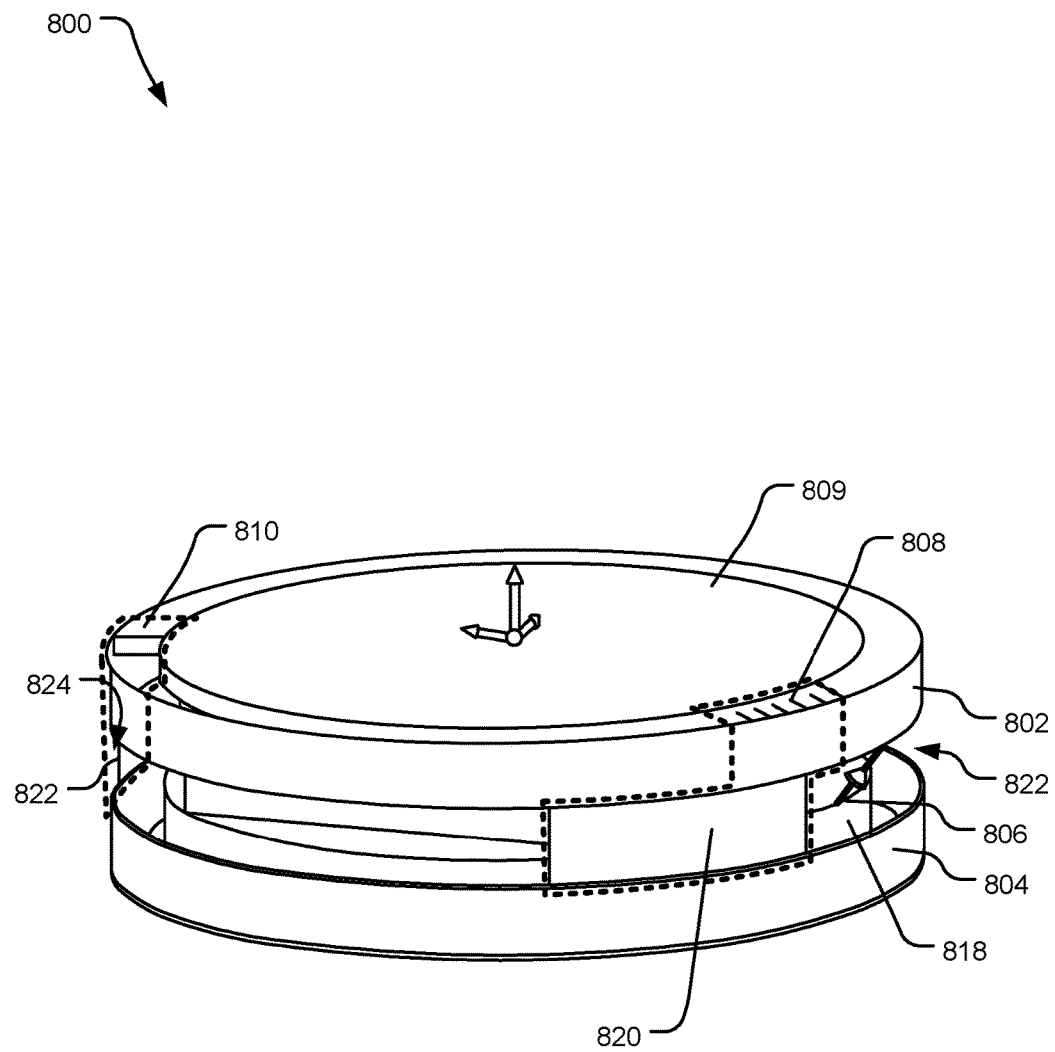
FIG. 8 illustrates a perspective view of an example tunable slot antenna integrated into a resonant cavity having a radio frequency feed between a conductive bezel section and a printed circuit board of an electronic device case.

FIG. 8 illustrates a perspective view of an example tunable slot antenna integrated into a resonant cavity having a radio frequency feed 806 between a conductive bezel section 802 and a printed circuit board 818 of an electronic device case 800. A conductive cap section 809 is surrounded by the conductive bezel section 802 and is separated from the conductive bezel section 802 by a gap. The conductive cap section 809 is also connected to the conductive bezel section 802 by two bezel slot gap shorts 808 (low band) and 810 (high band) to form bezel slots. The conductive bezel section 802 is also connected to the conductive ground plane section by two perimeter slot gap shorts 820 and 822 to form perimeter slots 824. The positions and radial (i.e., along the perimeter) lengths of the bezel slot gap shorts 808 and 810 and perimeter slot gap shorts 820 and 822 are tuned to frequency band resonances. The radio frequency feed 806 connects the printed circuit board 818 to the conductive bezel section 802.

Figure 9:
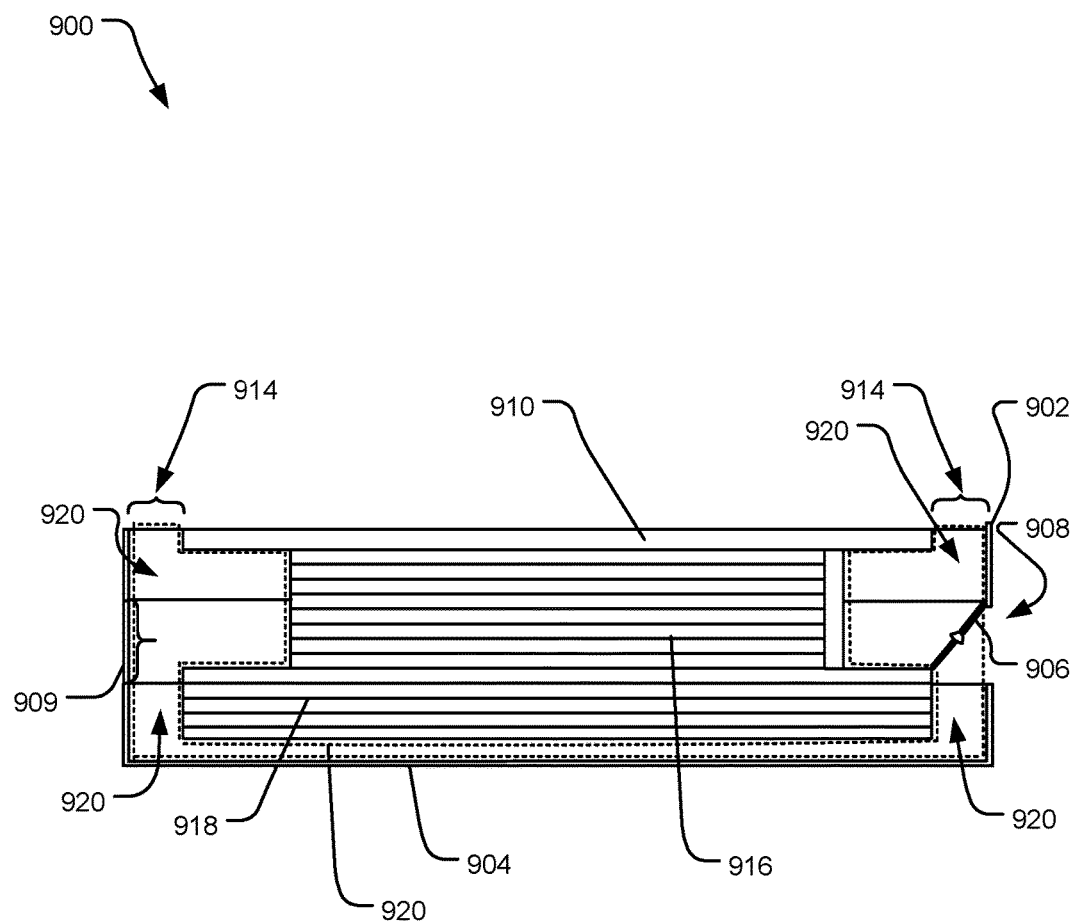
FIG. 9 illustrates a cross-sectional side view of an example tunable slot antenna integrated into a resonant cavity having a radio frequency feed between a conductive bezel section and a printed circuit board of an electronic device case.

FIG. 9 illustrates a cross-sectional side view of an example tunable slot antenna integrated into a resonant cavity 920 depicted by dashed lines having a radio frequency feed 906 between a conductive bezel section 902 and a printed circuit board 918 of an electronic device case 900. The conductive bezel section 902 and the conductive ground plane section 904 are positioned substantially parallel to each other, forming a perimeter gap, and are connected by two or more perimeter slot gap shorts (not shown). The perimeter slot gap shorts 909 divide the perimeter gap into two or more resonant perimeter slots 908. The positions and radial lengths of the perimeter slot gap shorts 909 are tuned to one or more frequency band resonances.

A conductive cap section 910 is positioned within the perimeter of the conductive bezel section 902, separated from the conductive bezel section 902 by a bezel gap. The conductive cap section 910 is connected to the conductive bezel section 902 by two or more bezel slot gap shorts to form two or more bezel slots 914. The positions and radial lengths of the bezel slot gap shorts are tuned to one or more frequency band resonances.

As shown, the conductive cap section 910 is formed as a display panel, covered by a transparent or translucent view panel, although other conductive cap sections may be employed. Other components of the electronic device case 900, including one or more plastic housing elements, air, a battery 916 and the printed circuit board (PCB) 918, form a resonant cavity 920 within the electronic device case 900. In FIG. 9, the resonant cavity 920 extends along the surface of the conductive ground plane section 904 and then substantially parallel to the perimeters of the conductive bezel section 902 and the conductive ground plane section 904. The radio frequency feed 906 connects a radio circuit on the printed circuit board 918 to the conductive bezel section 902.

Figure 10:
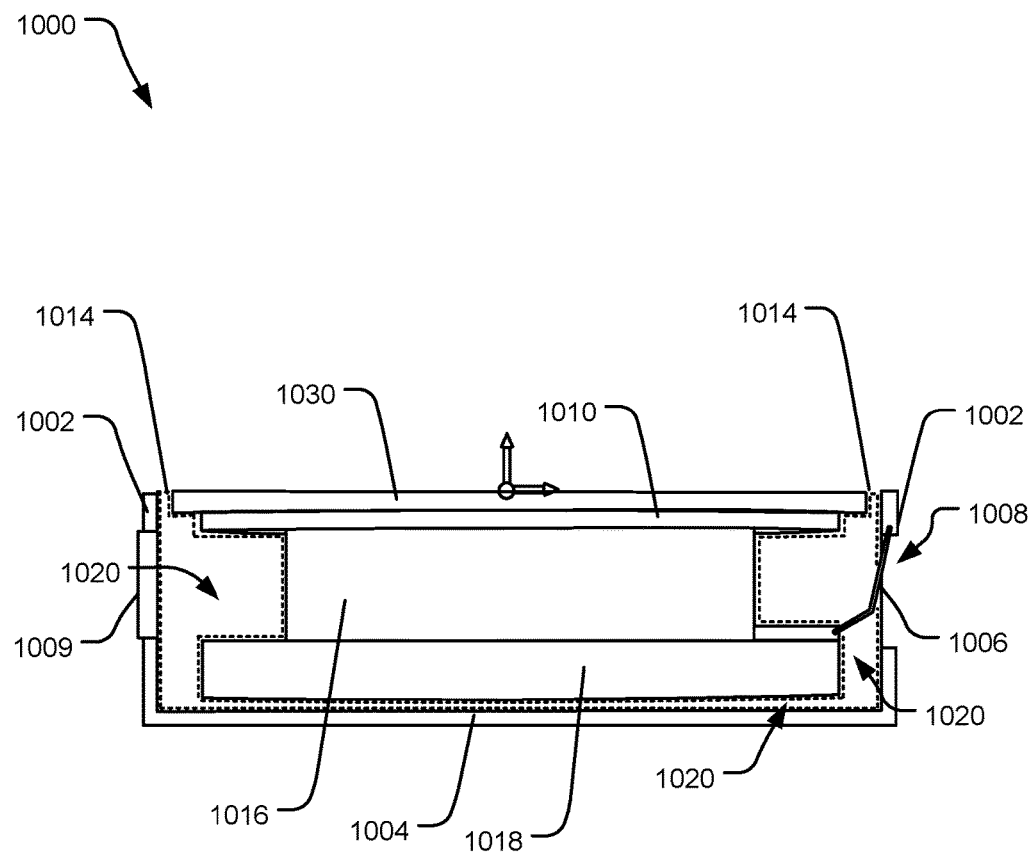
FIG. 10 illustrates a schematic side view of an example tunable slot antenna integrated into a resonant cavity having a radio frequency feed between a conductive bezel section and a printed circuit board of an electronic device case.

FIG. 10 illustrates a schematic side view of an example tunable slot antenna integrated into a resonant cavity 1020 depicted by dashed lines having a radio frequency feed 1006 between a conductive bezel section 1002 and a printed circuit board 1018 of an electronic device case 1000. The conductive bezel section 1002 and the conductive ground plane section 1004 are positioned substantially parallel to each other, forming a perimeter gap, and are connected by two or more perimeter slot gap shorts 1009. The perimeter slot gap shorts 1009 divide the perimeter gap into two or more resonant perimeter slots 1008. The positions and radial lengths of the perimeter slot gap shorts 1009 are tuned to one or more frequency band resonances.

A conductive cap section 1010 is positioned within the perimeter of the conductive bezel section 1002, separated from the conductive bezel section 1002 by a bezel gap. The conductive cap section 1010 is connected to the conductive bezel section 1002 by two or more bezel slot gap shorts to form two or more bezel slots 1014. The positions and radial lengths of the bezel slot gap shorts are tuned to one or more frequency band resonances.

As shown, the conductive cap section 1010 is formed as a display panel, covered by a transparent or translucent view panel 1030, although other conductive cap sections may be employed. Other components of the electronic device case 1000, including one or more plastic housing elements, air, a battery 1016 and the printed circuit board (PCB) 1018, form a resonant cavity 1020 within the electronic device case 1000. In FIG. 10, the resonant cavity 1020 extends along the surface of the conductive ground plane section 1004 and then substantially parallel to the perimeters of the conductive bezel section 1002 and the conductive ground plane section 1004. The radio frequency feed 1006 connects a radio circuit on the printed circuit board 1018 to the conductive bezel section 1002.

Figure 11:
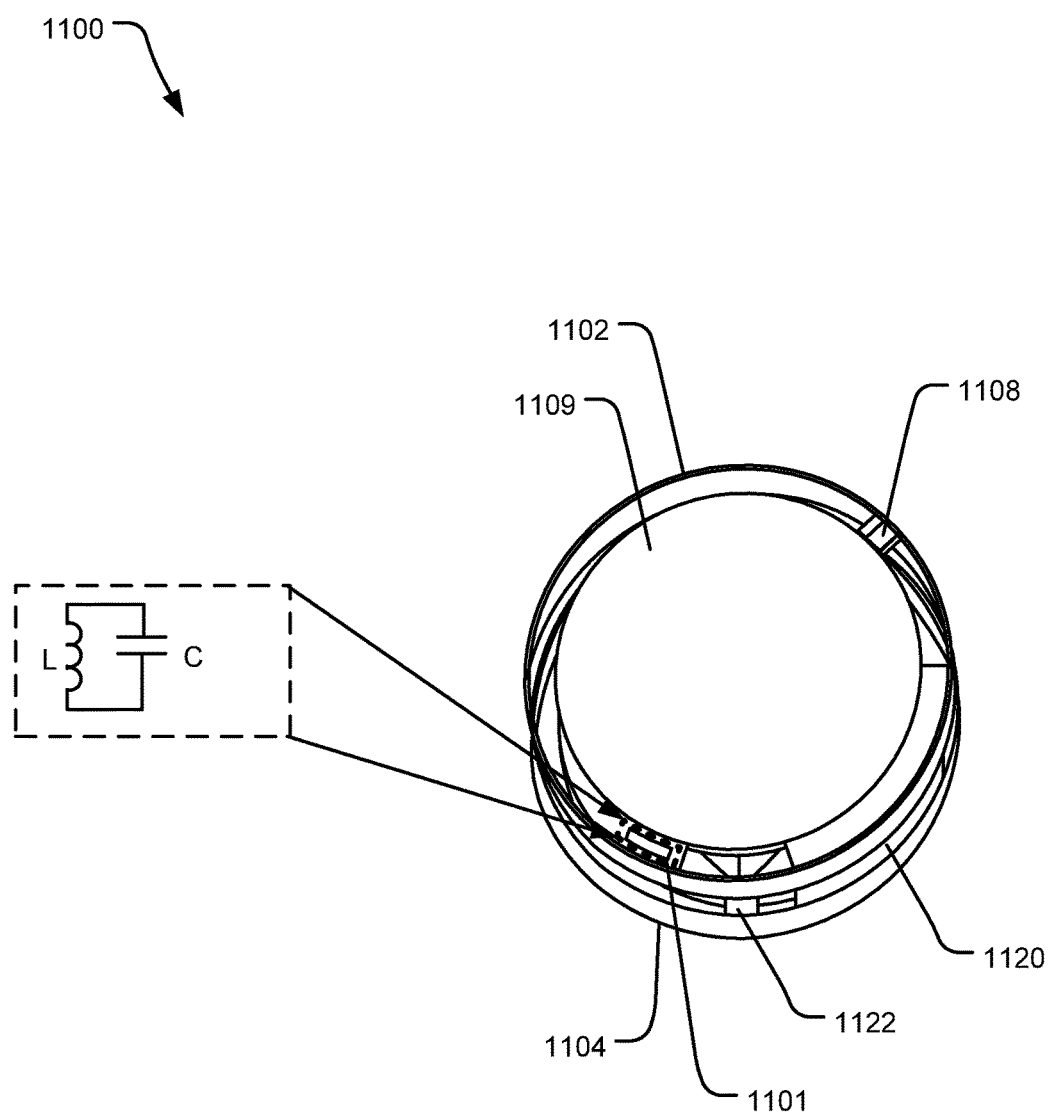
FIG. 11 illustrates a perspective view of an example tunable slot antenna integrated into a resonant cavity of an electronic device case and a tank circuit to operate global positioning system frequencies.

FIG. 11 illustrates a perspective view of an example tunable slot antenna integrated into a resonant cavity of an electronic device case 1100 and a tank circuit 1101 to operate global positioning system (GPS) frequencies. The tank circuit 1101 represents a parallel-LC circuit connected to the antenna, but other tank circuit configurations may also be used, such as a series-RLC circuit or series-LC circuit. A conductive cap section 1109 is surrounded by a conductive bezel section 1102 and is separated from the conductive bezel section 1102 by a gap. The conductive cap section 1109 is also connected to the conductive bezel section 1102 by a bezel slot gap short 1108 and the tank circuit 1101 to form bezel slots. The conductive bezel section 1102 is also connected to a conductive ground plane section 1104 by two perimeter slot gap shorts 1120 and 1122 to form perimeter slots. The positions and radial (i.e., along the perimeter) lengths of the bezel slot gap shorts 1108, the tank circuit 1101, and the perimeter slot gap shorts 1120 and 1122 are tuned to one or more frequency band resonances. The radio frequency feed 1106 connects a printed circuit board to the conductive bezel section 1102, the conductive bezel section 1102 to the conductive ground plane section 1104, or provides another feed configuration.

Figure 12:
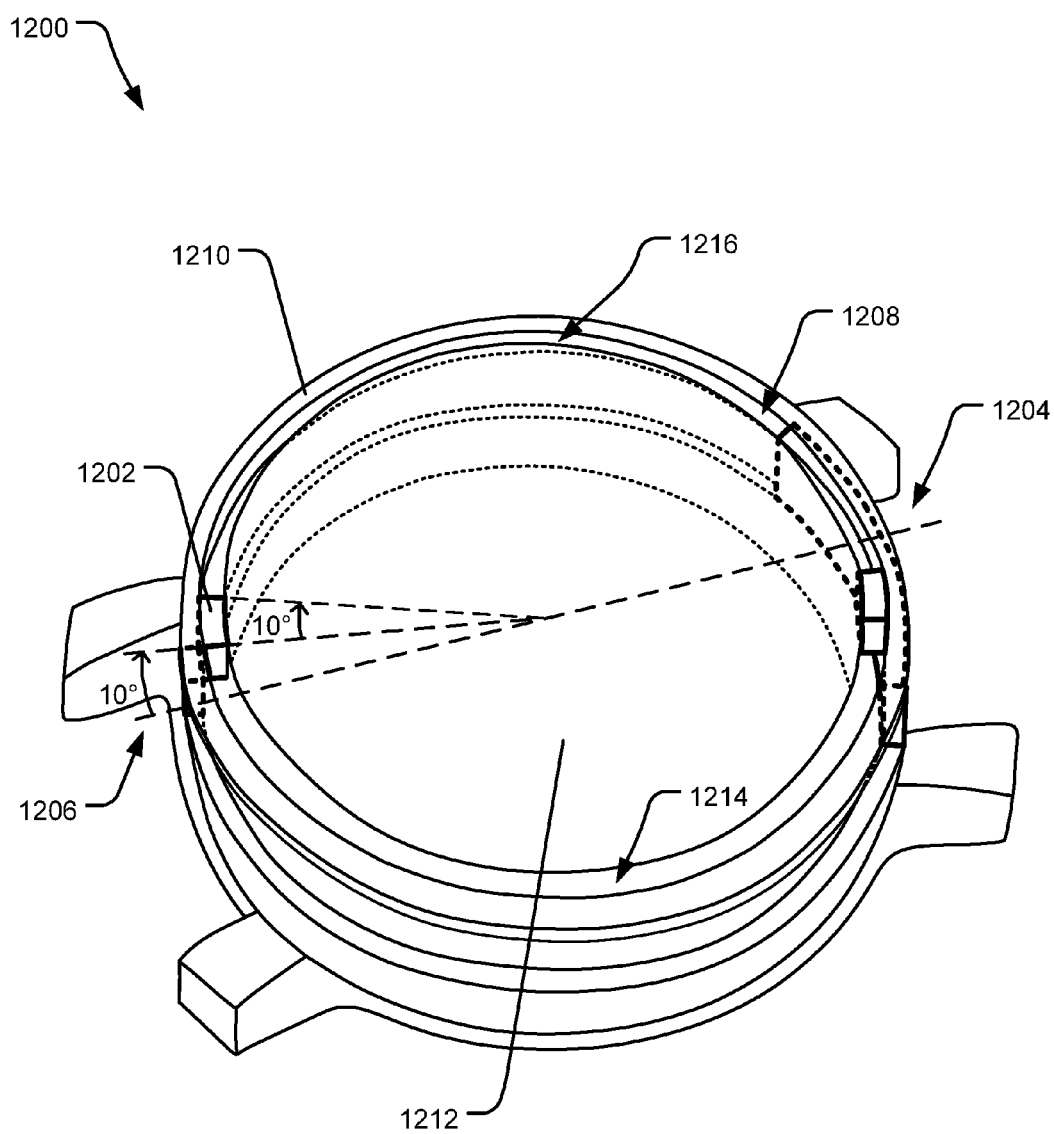
FIG. 12 illustrates an example tunable slot antenna integrated into a resonant cavity of an electronic device case, with an example configuration of a bezel slot gap short.

FIG. 12 illustrates an example tunable slot antenna 1200 integrated into a resonant cavity of an electronic device case, with an example configuration of a bezel slot gap short 1202. An axis is shown between axis ends 1204 and 1206, with axis end 1204 positioned at about 12:00 on a clock dial and axis end 1206 positioned at about 6:00 on the clock dial, although it should be noted that the electronic device case need not include an analog clock dial or any time keeping device. The time-related reference is intended only to provide a reference to the positioning and size of certain features of the example tunable slot antenna 1200.

The bezel slot gap short 1202 is positioned within a bezel slot gap 1208 between a conductive bezel section 1210 and a conductive cap section 1212 around the conductive cap section 1212 to provide a conductive path between the two sections 1210 and 1212 and forms boundaries of two bezel gap slots 1214 and 1216. In one implementation, the bezel slot gap short 1202 is positioned ten degrees in the clockwise direction from the axis end 1206 with an arc length of ten degrees, although positions and lengths may be employed, such as when dimensions of the electronic device case change, frequencies of operations change, etc.

Figure 13:
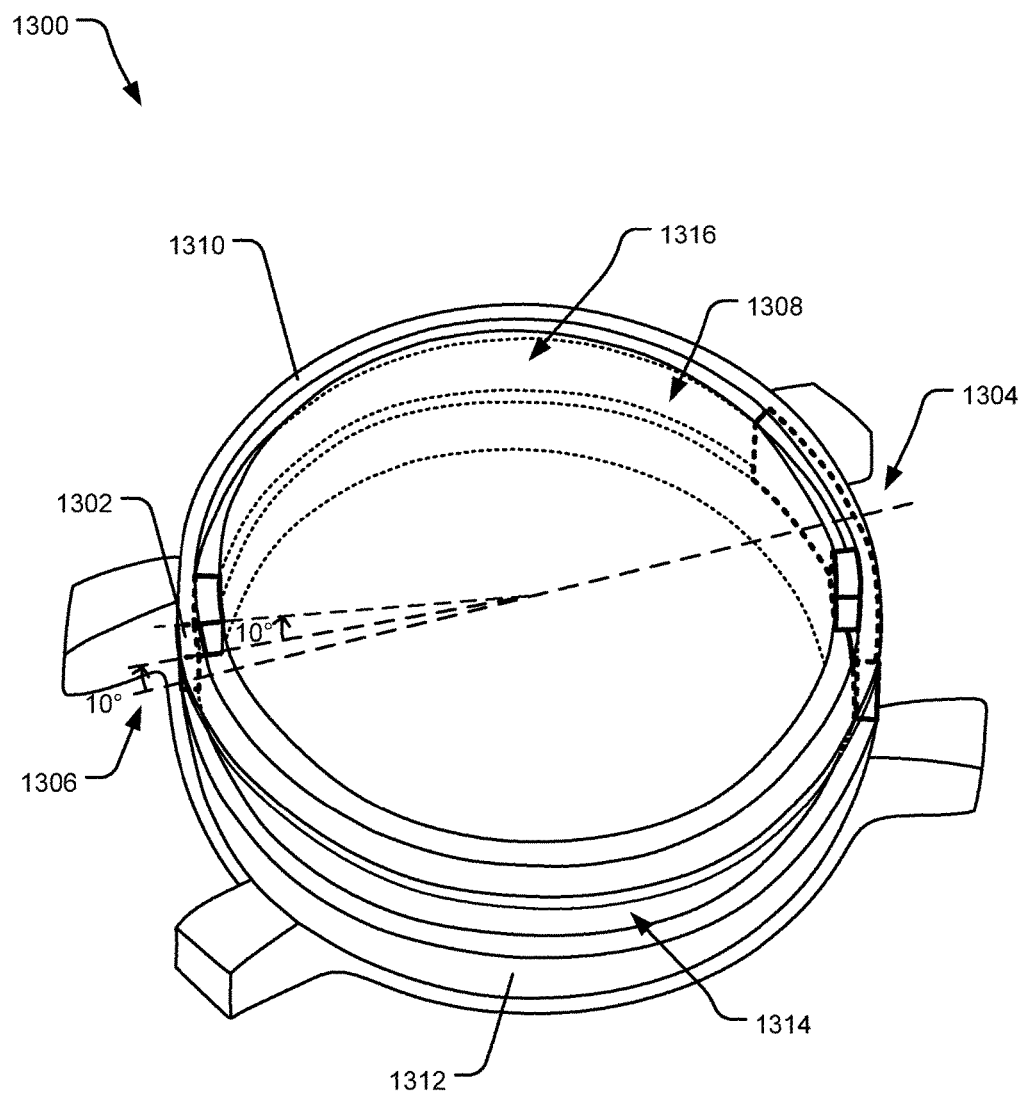
FIG. 13 illustrates an example tunable slot antenna integrated into a resonant cavity of an electronic device case, with an example configuration of a perimeter slot gap short.

FIG. 13 illustrates an example tunable slot antenna 1300 integrated into a resonant cavity of an electronic device case, with an example configuration of a perimeter slot gap short 1302. An axis is shown between axis ends 1304 and 1306, with axis end 1304 positioned at about 12:00 on a clock dial and axis end 1306 positioned at about 6:00 on the clock dial, although it should be noted that the electronic device case need not include an analog clock dial or any time keeping device. The time-related reference is intended only to provide a reference to the positioning and size of certain features of the example tunable slot antenna 1300.

The perimeter slot gap short 1302 is positioned within a perimeter slot gap 1308 around the perimeter between a conductive bezel section 1310 and a conductive ground plane section 1312 to provide a conductive path between the two sections 1310 and 1312 and forms boundaries of two perimeter gap slots 1314 and 1316. In one implementation, the perimeter slot gap short 1302 is positioned ten degrees in the clockwise direction from the axis end 1306 with an arc length of ten degrees, although positions and lengths may be employed, such as when dimensions of the electronic device case change, frequencies of operations change, etc.

Figure 14:
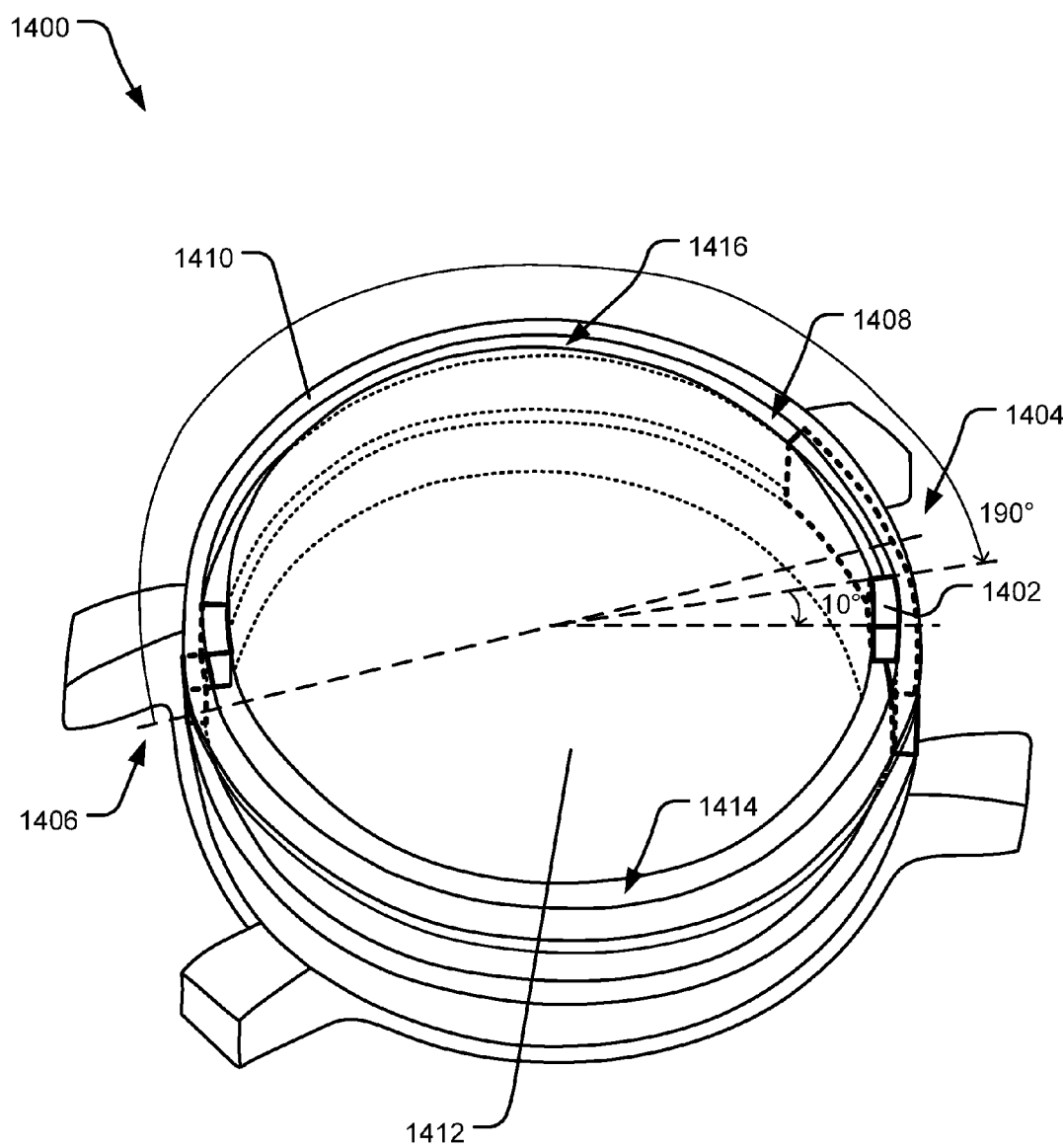
FIG. 14 illustrates an example tunable slot antenna integrated into a resonant cavity of an electronic device case, with an example configuration of another bezel slot gap short.

FIG. 14 illustrates an example tunable slot antenna 1400 integrated into a resonant cavity of an electronic device case, with an example configuration of another bezel slot gap short 1402. An axis is shown between axis ends 1404 and 1406, with axis end 1404 positioned at about 12:00 on a clock dial and axis end 1406 positioned at about 6:00 on the clock dial, although it should be noted that the electronic device case need not include an analog clock dial or any time keeping device. The time-related reference is intended only to provide a reference to the positioning and size of certain features of the example tunable slot antenna 1400.

The bezel slot gap short 1402 is positioned within a bezel slot gap 1408 between a conductive bezel section 1410 and a conductive cap section 1412 around the conductive cap section 1412 to provide a conductive path between the two sections 1410 and 1412 and forms boundaries of two bezel gap slots 1414 and 1416. In one implementation, the bezel slot gap short 1402 is positioned 190 degrees in the clockwise direction from the axis end 1406 with an arc length of ten degrees, although positions and lengths may be employed, such as when dimensions of the electronic device case change, frequencies of operations change, etc.

Figure 15:
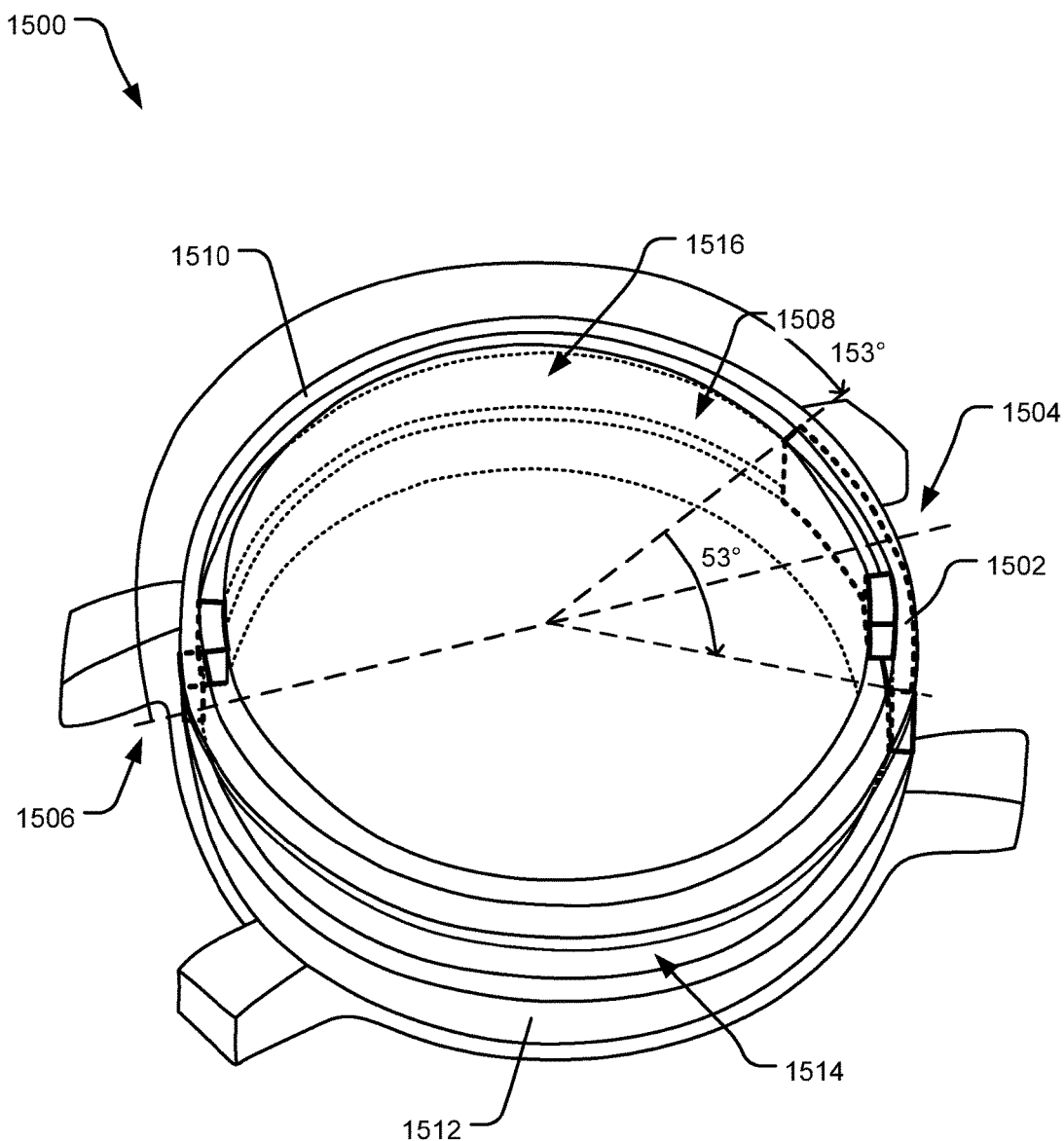
FIG. 15 illustrates an example tunable slot antenna integrated into a resonant cavity of an electronic device case, with an example configuration of another perimeter slot gap short.

FIG. 15 illustrates an example tunable slot antenna 1500 integrated into a resonant cavity of an electronic device case, with an example configuration of another perimeter slot gap short 1502. An axis is shown between axis ends 1504 and 1506, with axis end 1504 positioned at about 12:00 on a clock dial and axis end 1506 positioned at about 6:00 on the clock dial, although it should be noted that the electronic device case need not include an analog clock dial or any time keeping device. The time-related reference is intended only to provide a reference to the positioning and size of certain features of the example tunable slot antenna 1500.

The perimeter slot gap short 1502 is positioned within a perimeter slot gap 1508 around the perimeter between a conductive bezel section 1510 and a conductive ground plane section 1512 to provide a conductive path between the two sections 1510 and 1512 and forms boundaries of two perimeter gap slots 1514 and 1516. In one implementation, the perimeter slot gap short 1502 is positioned 153 degrees in the clockwise direction from the axis end 1506 with an arc length of 53 degrees, although positions and lengths may be employed, such as when dimensions of the electronic device case change, frequencies of operations change, etc.

The example short positions and arc lengths provide high radiation efficiency in the low band cellular frequencies (~700 MHz) and the high band cellular frequencies (1900 MHz) for the illustrated example tunable slot antennas 1200, 1300, 1400, and 1500.

Figure 16:
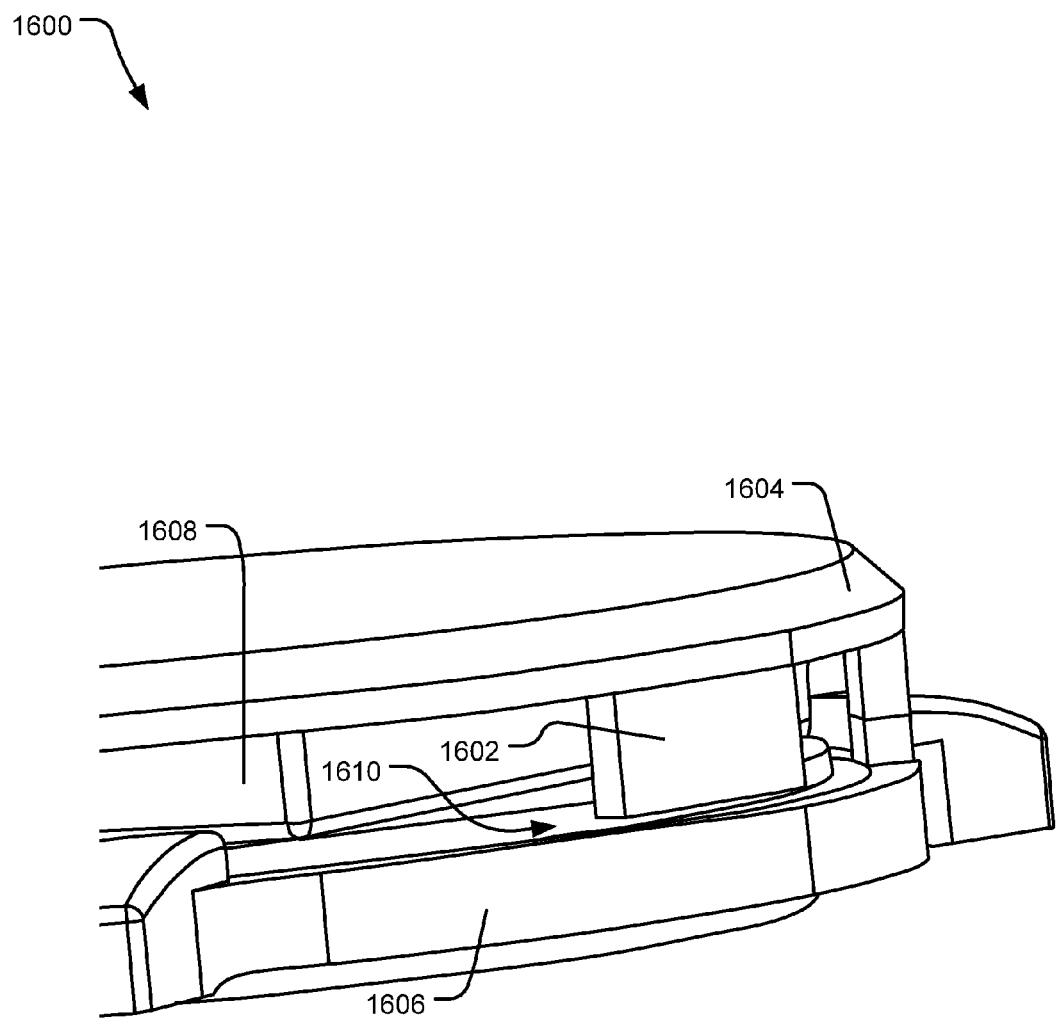
FIG. 16 illustrates an example metal stub that can be useful in tuning GPS and high band operations of an example tunable slot antenna integrated into a resonant cavity of an electronic device case.

FIG. 16 illustrates an example metal stub 1602 that can be useful in tuning GPS and high band operations of an example tunable slot antenna 1600 integrated into a resonant cavity of an electronic device case. The example metal stub 1602 can provide or enhance tuning of GPS and high band cellular operation of the tunable slot antenna 1600 by designing the metal stub 1602 at one of a variety of available heights between a conductive bezel section 1604 or to a conductive ground plane section 1606 and/or by connecting the metal stub 1602 to either the conductive bezel section 1604 or to the conductive ground plane section 1606. A battery 1608 or other components are shown within the electronic device case, forming part of the resonant cavity.

It should be noted that FIG. 16 illustrates the metal stub 1602 as being connected to the conductive bezel section 1604 and not to the conductive ground plane section 1606 (as shown by gap 1610), although the opposite configuration is also contemplated. In the illustrated implementation, the metal stub 1602 extends around the perimeter of the electronic device from about 3:00 to 3:00 on a clock dial, which tunes the slot antenna 1600 well in the GPS and high band cellular ranges (e.g., when employed in the design shown in FIGS. 19-22), although other dimensions and angular orientations may be employed.

Figure 17:
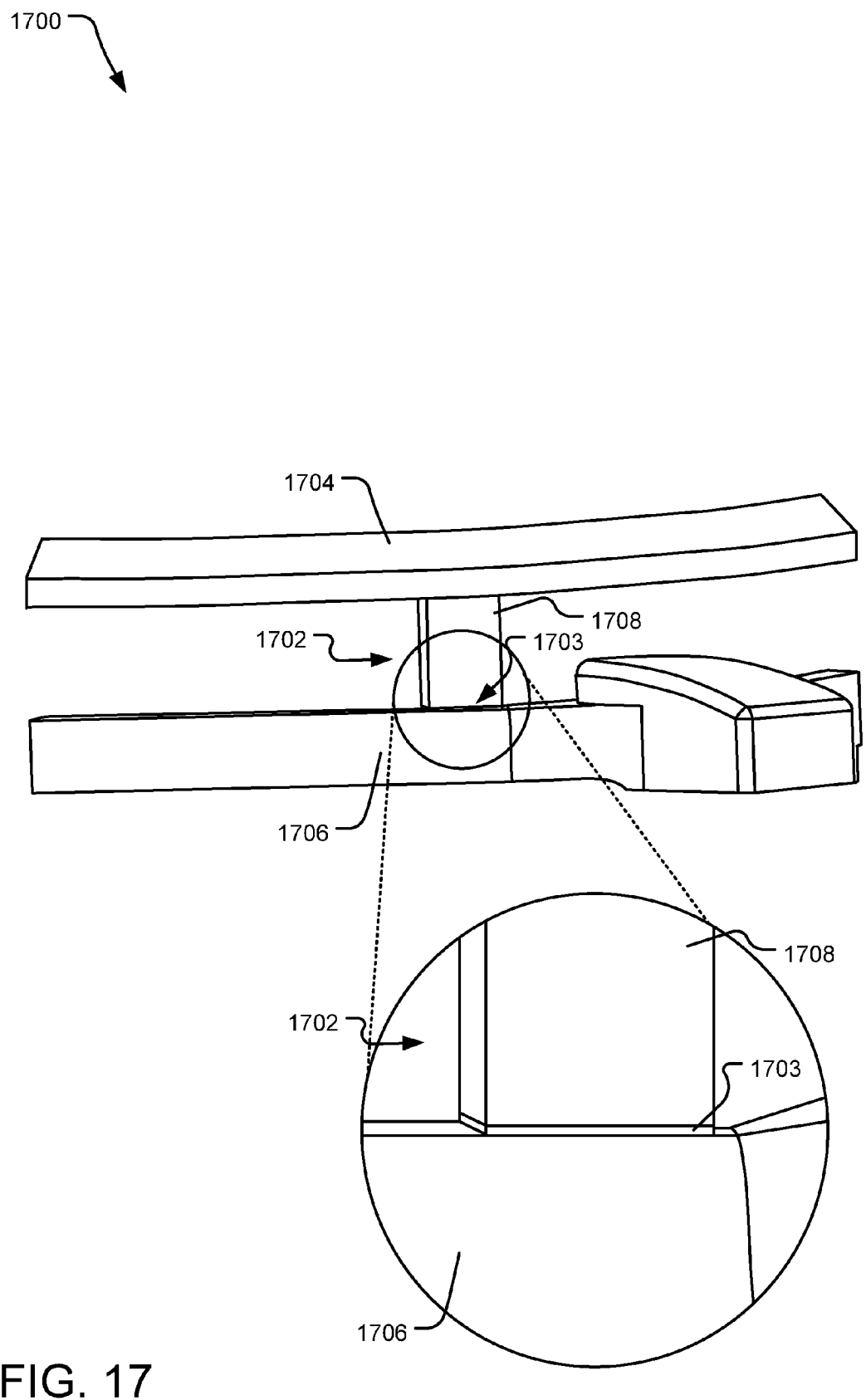
FIG. 17 illustrates an example integrated structural capacitor for tuning WiFi operations of an example tunable slot antenna integrated into a resonant cavity of an electronic device case.

FIG. 17 illustrates an example integrated structural capacitor 1702 for tuning WiFi operations of an example tunable slot antenna 1700 integrated into a resonant cavity of an electronic device case. The integrated capacitor 1702 is shown as a metal stub 1708 connected to a conductive bezel section 1704 and forming a gap 1703 between the metal stub 1708 and a conductive ground plane section 1706. The gap 1703 is filled with a dielectric and acts as the capacitive gap between the metal stub 1708 and the conductive ground plane section 1706.

In the illustrated implementation of FIG. 17, the gap 1703 of the capacitor element 1710 is 0.1 mm and the dielectric in the gap 1703 has a dielectric constant of 16. The metal stub 1708 of the capacitor element 1710 is 2.67 mm wide, 1.3 mm thick, and extends 3.9 mm from the conductive bezel section 1704, although other dimensions may be employed in alternative implementations. The integrated capacitor 1702 can provide or enhance tuning of WiFi operation of the tunable slot antenna 1700. It should be noted that FIG. 17 illustrates the metal stub 1708 as being connected to the conductive bezel section 1704 and not to the conductive ground plane section 1706, although the opposite configuration is also contemplated. The integrated structural capacitor 1702 can be used in place of or in combination with a discrete capacitor between the conductive bezel section 1704 and the conductive ground plane section 1704 to assist in tuning low band WiFi operation. In one implementation, the structural capacitor 1702 is positioned at a 9:00 on a clock dial to tune the low band WiFi operation, although other dimensions and angular orientations may be employed.

Figure 18:
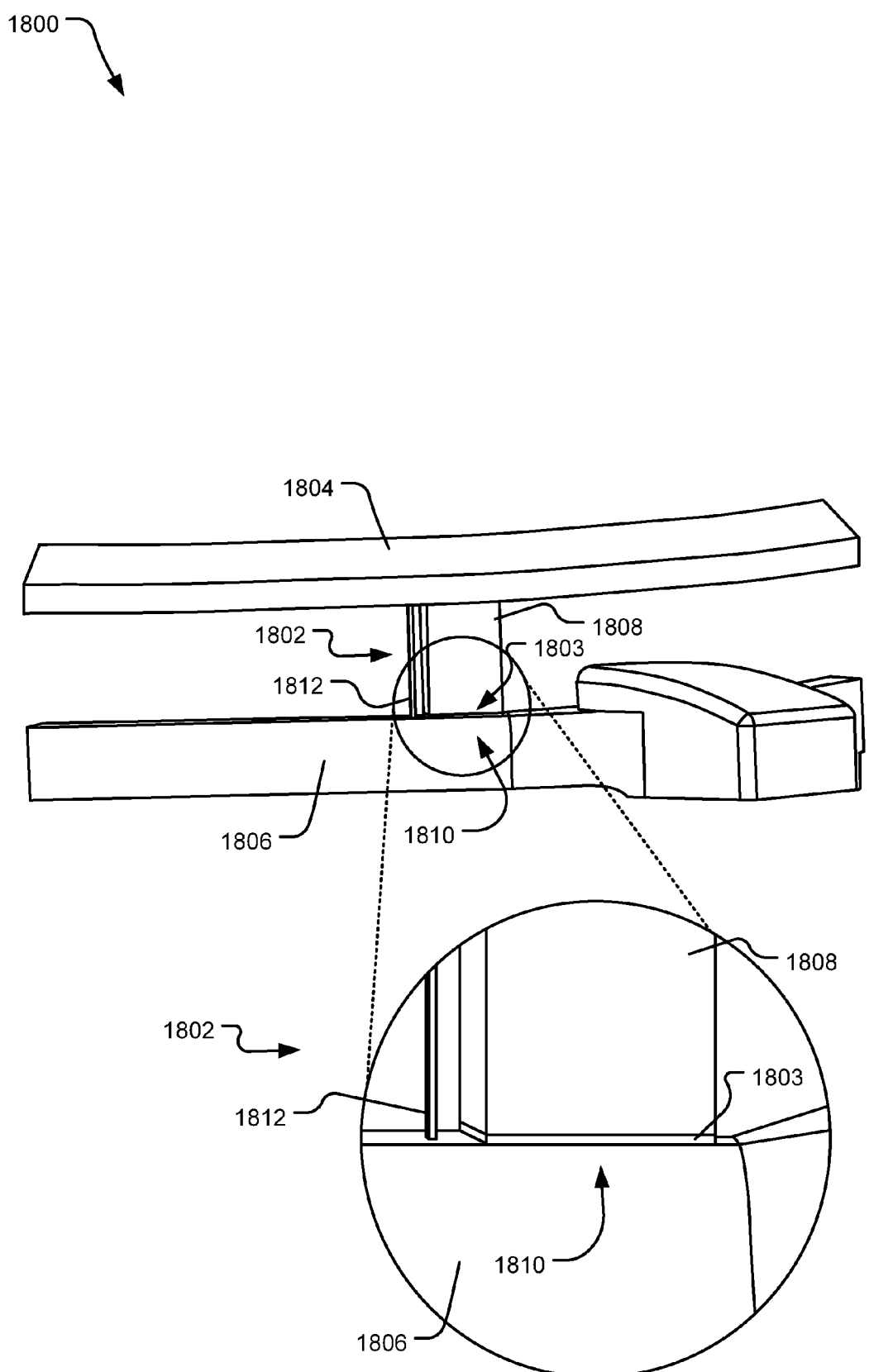
FIG. 18 illustrates an example integrated structural tank circuit for tuning GPS and high band cellular operations of an example tunable slot antenna integrated into a resonant cavity of an electronic device case.

FIG. 18 illustrates an example integrated structural tank circuit 1802 for tuning GPS and high band cellular operations of an example tunable slot antenna 1800 integrated into a resonant cavity of an electronic device case. The integrated structural tank circuit 1802 circuit 1802 is formed as at least a structural portion of the electronic device case rather than being constructed from one or more discretely packaged electronic components soldered to the electronic device case. The integrated structural tank circuit 1802 includes one or more metal stubs 1808 connected to a conductive bezel section 1804 and forming a gap 1803 between the metal stub 1808 and a conductive ground plane section 1806. The gap 1803 is filled with a dielectric and acts as the capacitive gap between the metal stub 1808 and the conductive ground plane section 1806 to form a capacitor element 1810. The integrated tank circuit 1802 also includes a conductive inductor element 1812 formed as a thin conductive trace connected between the conductive bezel section 1804 and the conductive ground plane section 1806 and spaced a short distance (e.g., about 0.5 mm to 2.5 mm) from the conductive inductor element 1812.

In the illustrated implementation of FIG. 18, the integrated structural tank circuit 1802 is positioned at 1:25-1:30 on a clock dial, although other angular orientations may be employed. The integrated structural tank circuit 1802 is open at GPS bands, allowing tuning and operation at high band cellular frequency ranges.

The gap 1803 of the capacitor element 1810 is 0.1 mm and the dielectric in the gap 1803 has a dielectric constant of 16. The metal stub 1808 of the capacitor element 1810 is 2.67 mm wide, 1.3 mm thick, and extends 3.9 mm from the conductive bezel section 1804, although other dimensions and dielectric constants may be employed in alternative implementations. The metal trace of the inductor element 1812 connects the conductive bezel section 1804 and the conductive ground plane section 1806 at a length of 4 mm, a width of 0.25 mm and a thickness of 0.1 mm. The integrated tank circuit 1802 can provide or enhance tuning of GPS operation of the tunable slot antenna 1800. It should be noted that FIG. 18 illustrates the metal stub 1808 as being connected to the conductive bezel section 1804 and not to the conductive ground plane section 1806, although the opposite configuration is also contemplated. In an alternative implementation, the capacitor element 1810 and the inductor element 1812 may be employed separately, without the other element in close proximity.

Figure 19:
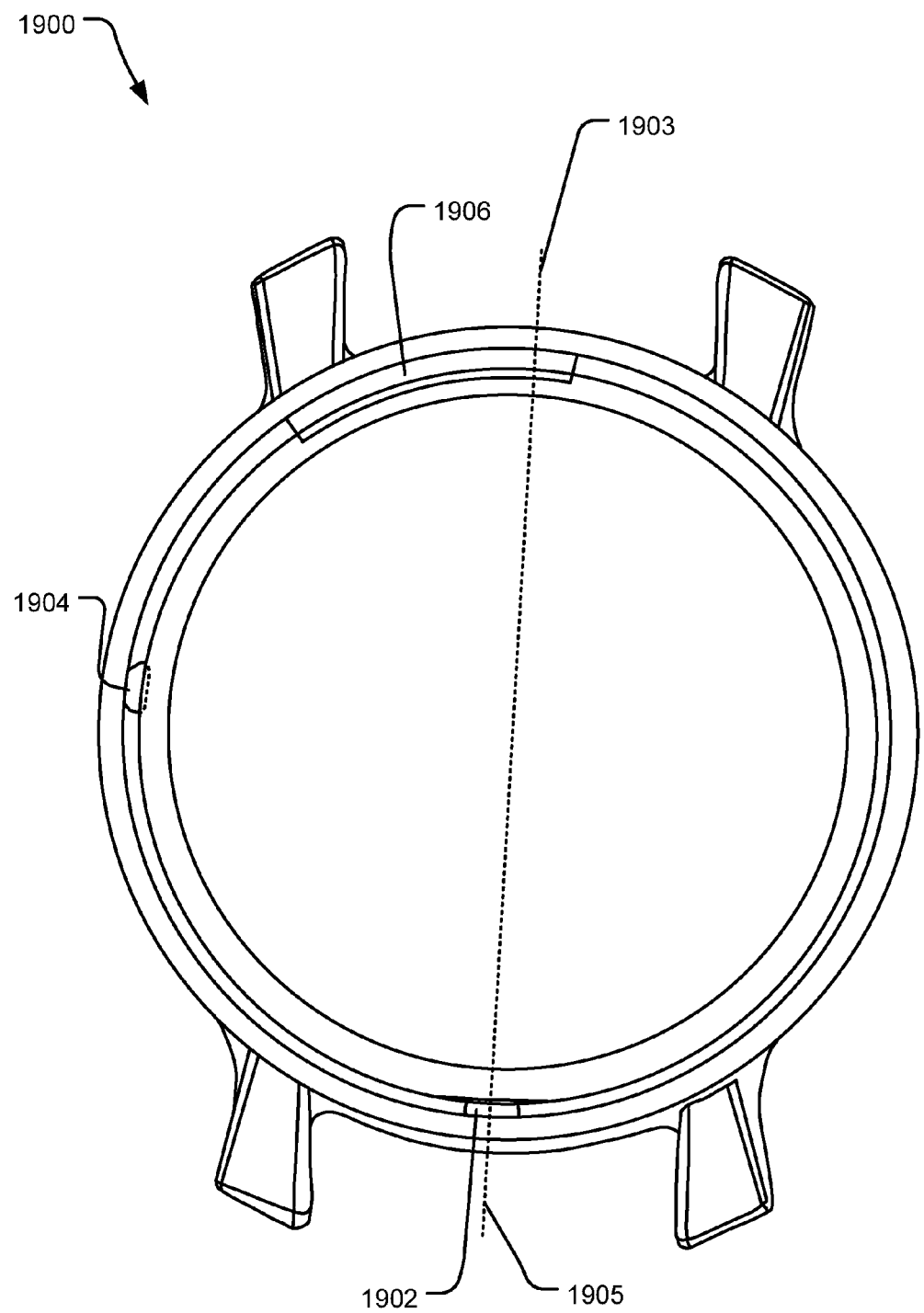
FIG. 19 illustrates an alternative slot antenna design of an example tunable slot antenna integrated into a resonant cavity of an electronic device case.

FIG. 19 illustrates an alternative slot antenna design of an example tunable slot antenna 1900 integrated into a resonant cavity of an electronic device case. An axis 1902 represents an axis between 12:00 (at end 1903) and 6:00 (at end 1905) on a clock dial.

As illustrated, a radio frequency feed 1902 is positioned at 6:00 on a clock dial to excite the slot antenna 1900. A capacitor 1904 (discrete or structurally integrated) is positioned between a conductive bezel section and a conductive cap section at about 9:00 on a clock dial to tune low band WiFi operation. A single conductive bezel slot gap short 1906 is positioned at about 10:00-12:15 on a clock dial. Though not shown in FIG. 19, a perimeter slot gap short is positioned at about 10:00-12:00 on a clock dial, and another perimeter slot gap short is positioned at about 6:45-8:15 on a clock dial. In this design, the slot antenna 1900 can provide five tuned bands of operation—high band and low band cellular, high band and low band WiFi, and GPS operations. This alternative design implementation is further described with regard to FIGS. 20-22. Furthermore, one or more alternative designs may employed a single perimeter slot gap short.

Figure 20:
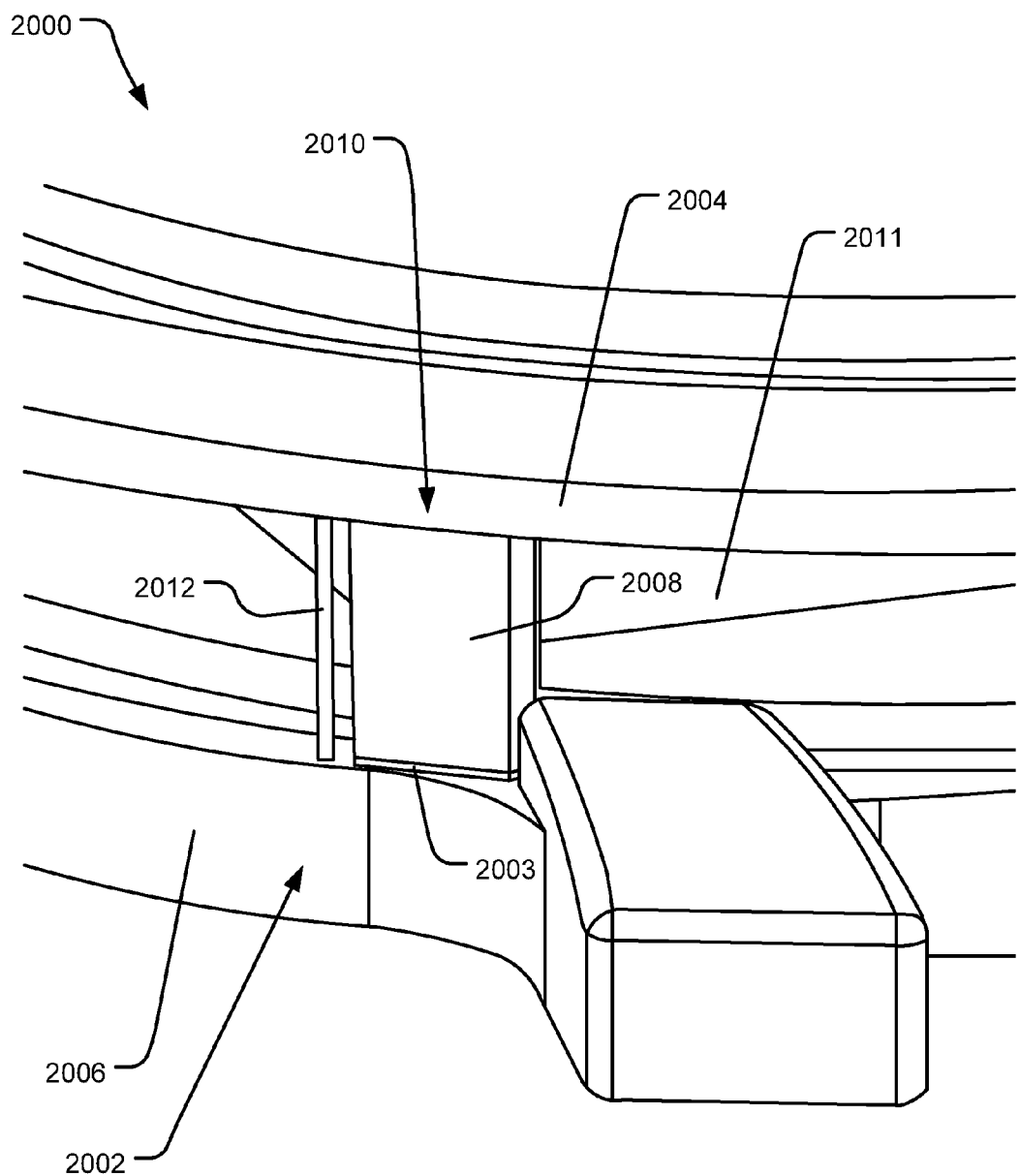
FIG. 20 illustrates an example integrated structural tank circuit in an alternative slot antenna design of an example tunable slot antenna integrated into a resonant cavity of an electronic device case.

FIG. 20 illustrates an example integrated structural tank circuit 2002 in an alternative slot antenna design of an example tunable slot antenna 2000 integrated into a resonant cavity of an electronic device case. The integrated structural tank circuit 2002 forms a parallel LC circuit and includes a metal stub 2008 connected to a conductive bezel section 2004 and forming a gap 2003 between the metal stub 2008 and a conductive ground plane section 2006. The gap 2003 is filled with a dielectric and acts as the capacitive gap between the metal stub 2008 and the conductive ground plane section 2006 to form a capacitor element 2010. The integrated tank circuit 2002 also includes a conductive inductor element 2012 formed as a thin conductive trace connected between the conductive bezel section 2004 and the conductive ground plane section 2006 and spaced a short distance (e.g., about 0.5 mm to 2.5 mm) from the conductive inductor element 2012. Internal components 2011 of the electronic device (e.g., a battery) reside within the electronic device case and provide a surface portion of the resonant cavity.

In the illustrated implementation of FIG. 20, the integrated structural tank circuit 2002 is positioned at 1:20-1:25 on a clock dial, although other angular orientations may be employed. The integrated structural tank circuit 2002 is open at GPS bands, allowing tuning and operation at high band cellular frequency ranges.

The gap 2003 of the capacitor element 2010 is 0.1 mm and the dielectric in the gap 2003 has a dielectric constant of 16. The metal stub 2008 of the capacitor element 2010 is 2.67 mm wide, 1.3 mm thick, and extends 3.9 mm from the conductive bezel section 2004, although other dimensions may be employed in alternative implementations. The metal trace of the inductor element 2012 connects the conductive bezel section 2004 and the conductive ground plane section 2006 at a length of 4 mm, a width of 0.25 mm and a thickness of 0.1 mm, although other dimensions may be employed in alternative implementations. The integrated tank circuit 2002 can provide or enhance tuning of GPS operation of the tunable slot antenna 2000. It should be noted that FIG. 20 illustrates the metal stub 2008 as being connected to the conductive bezel section 2004 and not to the conductive ground plane section 2006, although the opposite configuration is also contemplated.

Figure 21:
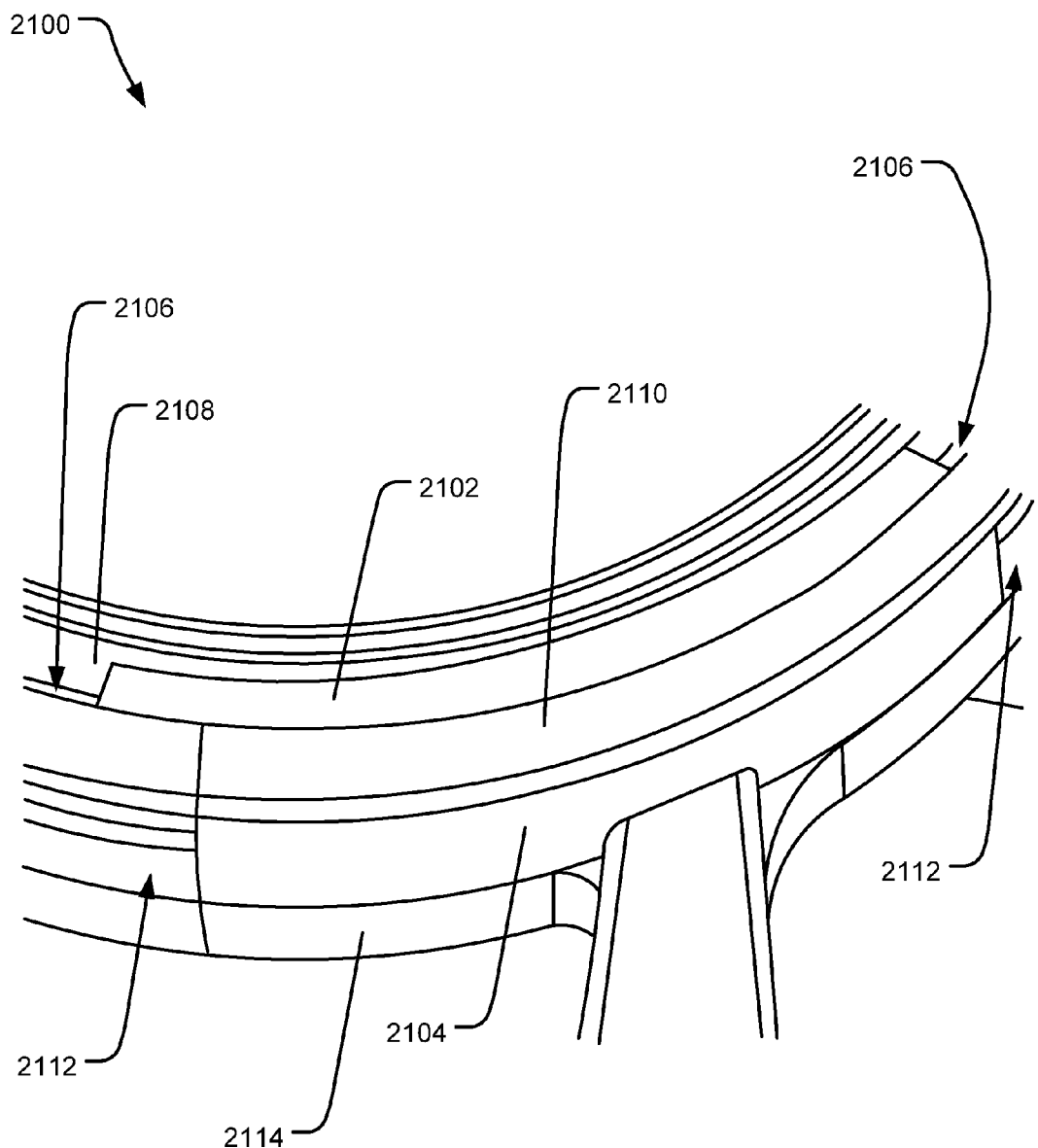
FIG. 21 illustrates an example bezel slot gap short and an example perimeter slot gap short in an alternative slot antenna design of an example tunable slot antenna integrated into a resonant cavity of an electronic device case.

FIG. 21 illustrates an example bezel slot gap short 2102 and an example perimeter slot gap short 2104 in an alternative slot antenna design of an example tunable slot antenna 2100 integrated into a resonant cavity of an electronic device case. The bezel slot gap short 2102 provides a short circuit across a bezel gap 2106 between a conductive cap section 2108 and a conductive bezel section 2110. The perimeter slot gap short 2114 provides a short circuit across a perimeter slot 2112 between the conductive bezel section 2110 and a conductive ground plane section 2114.

In the implementation illustrated in FIG. 21, the bezel slot gap short 2102 is positioned at about 10:00-12:15 on a clock dial, and the perimeter slot gap 21 short is positioned at about 10:00-12:00 on a clock dial, and another perimeter slot gap short is positioned at about 6:45-8:15 on a clock dial, although other dimensions and angular orientations may be employed.

Figure 22:
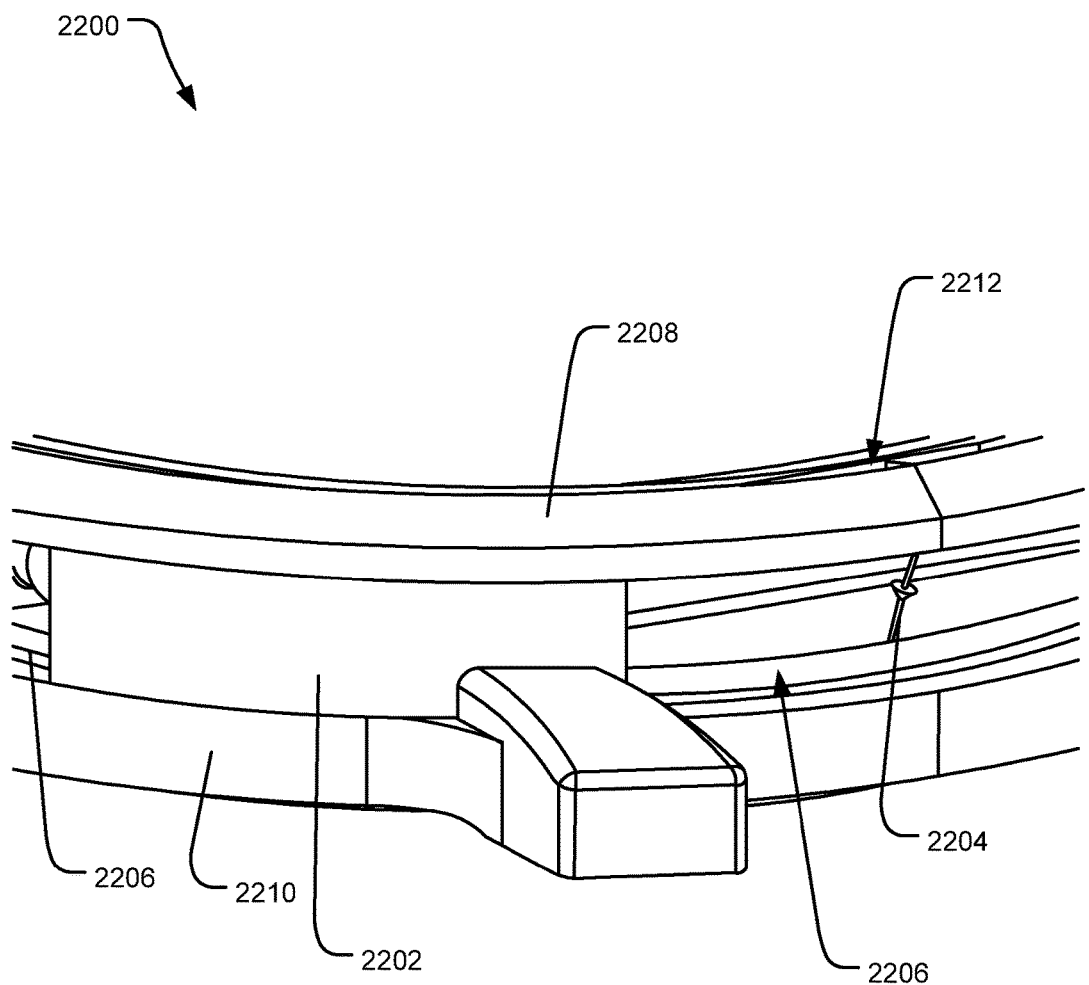
FIG. 22 illustrates another example perimeter slot gap short and a radio frequency feed in an alternative slot antenna design of an example tunable slot antenna integrated into a resonant cavity of an electronic device case.

FIG. 22 illustrates another example perimeter slot gap short 2202 and a radio frequency feed 2204 in an alternative slot antenna design of an example tunable slot antenna 2200 integrated into a resonant cavity of an electronic device case. The perimeter slot gap shorts 2202 provides a short circuit across a perimeter slot 2206 between the conductive bezel section 2208 and a conductive ground plane section 2210. The perimeter slot gap short 2202 is positioned at about 6:45-8:15 on a clock dial, although other dimensions and angular orientations may be employed. A bezel slot 2212 resides between a conductive cap section (not shown) and the conductive bezel section 2208, and the perimeter slot 2206 resides between the conductive bezel section 2208 and the conductive ground plane section 2210. The radio frequency feed 2204 connects an internal component (e.g., a PCB board) to the conductive bezel section 2208. In an alternative implementation, the radio frequency feed 2204 can connect between the conductive bezel section 2208 and the conductive ground plane section 2210.

Figure 23:
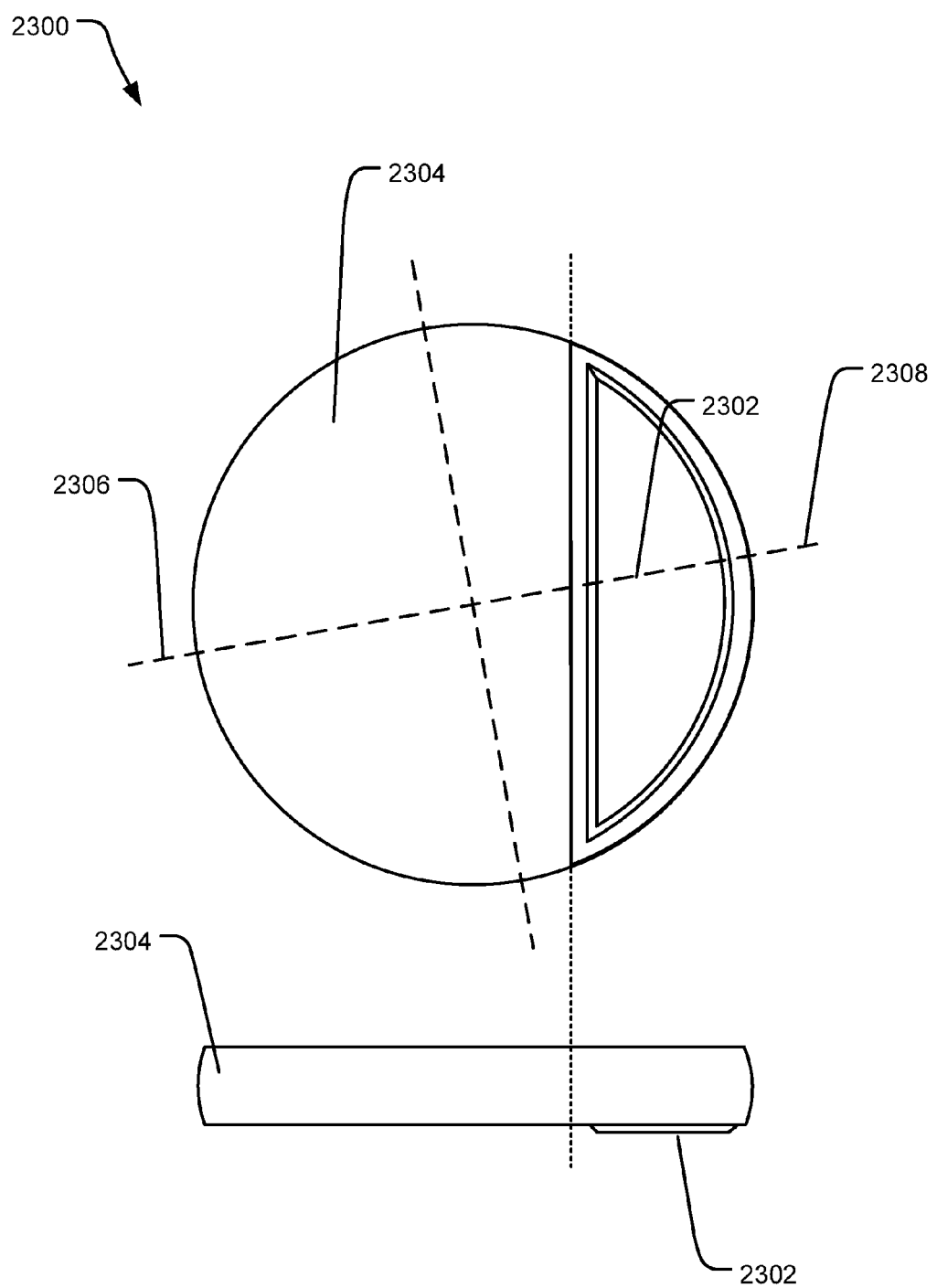
FIG. 23 illustrates an example tuning step feature on a conductive ground plane section of an alternative slot antenna design of an example tunable slot antenna integrated into a resonant cavity of an electronic device case.

FIG. 23 illustrates an example tuning step feature 2302 on a conductive ground plane section 2304 of an alternative slot antenna design of an example tunable slot antenna 2300 integrated into a resonant cavity of an electronic device case. In one implementation, the tuning step feature 2302 conductive and is positioned on or integrated into the exterior surface of the conductive ground plane 2304, with a thickness of 0.6 mm in a low current region of the conductive ground plane 2304 during low band cellular (or WiFi) operation. In the orientation shown (with axis end 2306 representing 12:00 on a clock dial and axis end 2308 representing 6:00 on a clock dial, the 0.6 mm step feature 2302 turns the slot antenna 2300 for low band WiFi (e.g., 2.4 GHz) operation, although other dimensions and orientations may be employed.

In an alternative implementation, the tuning step feature 2302 is formed on the printed circuit board of the internal components within the electronic device case. In this implementation, the tuning step feature 2302 resides within the ground plane resonant cavity portion.

Figure 24:
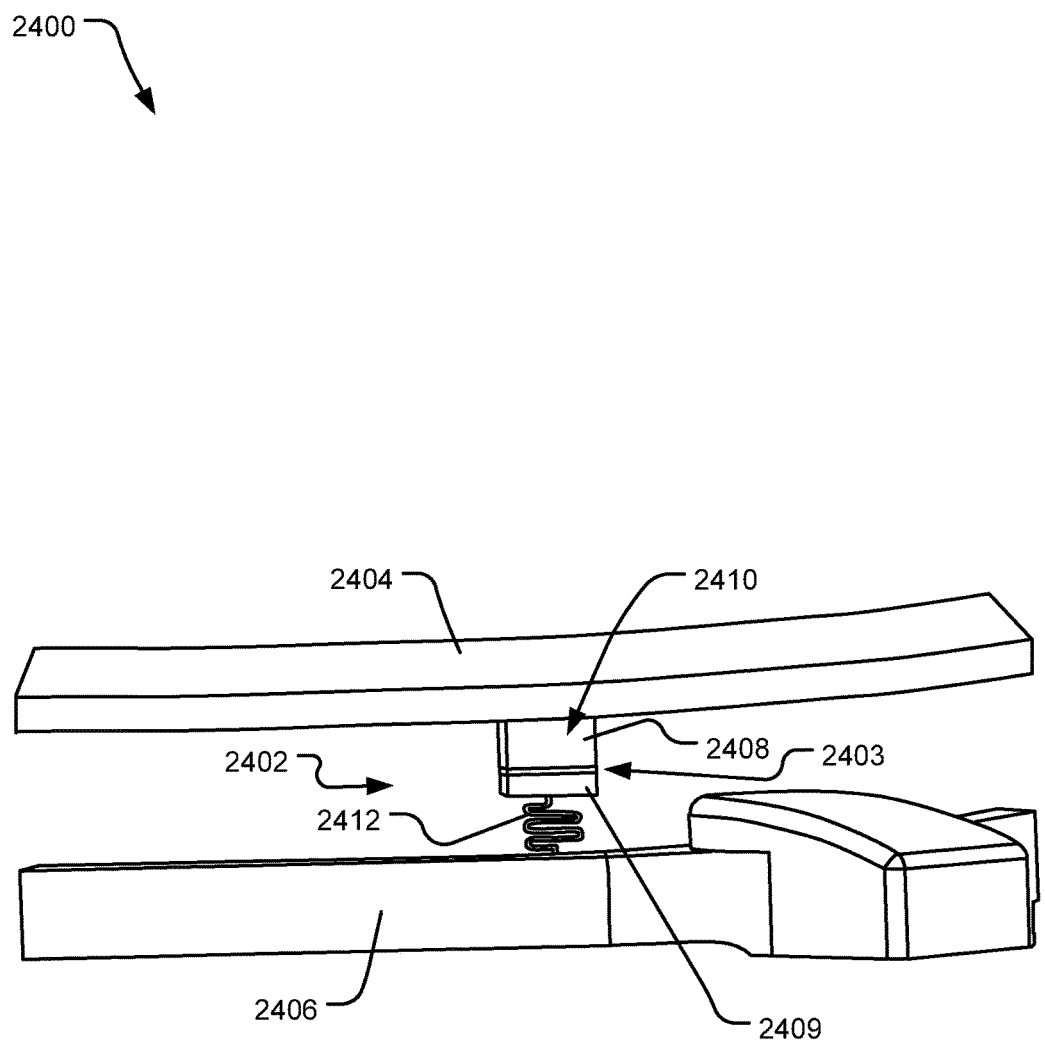
FIG. 24 illustrates another example integrated structural tank circuit in an alternative slot antenna design of an example tunable slot antenna integrated into a resonant cavity of an electronic device case.

FIG. 24 illustrates another example integrated structural tank circuit 2402 in an alternative slot antenna design of an example tunable slot antenna 2400 integrated into a resonant cavity of an electronic device case. The integrated structural tank circuit 2402 forms a serial LC circuit and includes two metal stubs 2408 and 2409 connected to a conductive bezel section 2404 and separated by a gap 2403 between the two metal stub 2408 and 2409. The gap 2403 is filled with a dielectric and acts as the capacitive gap between the metal stubs 2408 and 2409. The integrated tank circuit 2402 also includes a conductive inductor element 2412 formed as a thin conductive trace connected between the metal stub 2409 and the conductive ground plane section 2406. Internal components 2411 of the electronic device (e.g., a battery) reside within the electronic device case and provide a surface portion of the resonant cavity.

In the illustrated implementation of FIG. 24, the integrated structural tank circuit 2402 is positioned at 1:20-1:25 on a clock dial, although other angular orientations may be employed. The integrated structural tank circuit 2402 is open at GPS bands, allowing tuning and operation at high band cellular frequency ranges.

The gap 2403 of the capacitor element 2410 is 0.1 mm and the dielectric in the gap 2403 has a dielectric constant of 16. The metal stub 2408 of the capacitor element 2410 is 2.67 mm wide, 1.3 mm thick, and extends 3.9 mm from the conductive bezel section 2404, and the metal stub 2409 of the capacitor element 2410 is 2.67 mm wide, 1.3 mm thick, and extends from the gap 2403, although other dimensions and dielectric constants may be employed in alternative implementations. The metal trace of the inductor element 2412 connects the metal stub 2409 and the conductive ground plane section 2406 with a width of 0.25 mm and a thickness of 0.1 mm, although other dimensions may be employed in alternative implementations. The integrated tank circuit 2402 can provide or enhance tuning of GPS operation of the tunable slot antenna 2400. It should be noted that FIG. 24 illustrates the metal stub 2408 as being connected to the conductive bezel section 2404 and not to the conductive ground plane section 2406, although the opposite configuration is also contemplated.

A first example apparatus includes a conductive cap section, a conductive bezel section forming a perimeter outside the conductive cap section and separated from the conductive cap section by a bezel gap, and a conductive ground plane section forming a perimeter and being positioned opposite the conductive cap section and the conductive bezel section. The conductive ground plane section is separated from the conductive bezel section by a perimeter gap. One or more components residing between the conductive bezel section and the conductive ground plane section form a resonant cavity including a ground plane resonant cavity portion between the one or more components and the conductive ground plane section and another resonant cavity portion between the one or more components and the perimeters of the conductive bezel section and the conductive ground plane section.

An apparatus of any previous example apparatus further includes one or more bezel slot gap shorts spanning the bezel gap to connect the conductive cap section to the conductive bezel section and forming one or more bezel slots between the conductive cap section and the conductive bezel section.

An example apparatus of any previous example apparatus further includes two or more perimeter slot gap shorts spanning the perimeter gap to connect the conductive bezel section to the conductive ground plane section and forming one or more perimeter slots between the conductive bezel section and the conductive ground plane section.

An example apparatus of any previous example apparatus further includes one or more bezel slot gap shorts spanning the bezel gap to connect the conductive cap section to the conductive bezel section and forming one or more bezel slots between the conductive cap section and the conductive bezel section, and two or more perimeter slot gap shorts spanning the perimeter gap to connect the conductive bezel section to the conductive ground plane section and forming one or more perimeter slots between the conductive bezel section and the conductive ground plane section. Each bezel slot gap short is radially aligned with a perimeter slot gap short. At least one perimeter slot gap short is than at least one aligned bezel slot gap short.

Another example apparatus of any previous example apparatus further provides at least a dual frequency band antenna operation and further includes a single feed structure.

Another example apparatus of any previous example apparatus wherein the one or more components includes a printed circuit board and further including a single radio frequency feed structure connecting the printed circuit board to the conductive bezel section.

Another example apparatus of any previous example apparatus further including a single radio frequency feed structure connecting the conductive cap section to the conductive bezel section.

Another example apparatus of any previous example apparatus wherein the one or more components includes a printed circuit board and a battery.

Another example apparatus of any previous example apparatus wherein the apparatus directs a radio frequency carrier wave away from the conductive ground plane section.

Another example apparatus of any previous example apparatus further includes tank circuit connecting between the conductive cap section and the conductive bezel section. The tank circuit provides a short circuit condition between the conductive cap section and the conductive bezel section at a first frequency band and a non-short circuit condition between the conductive cap section and the conductive bezel section at one or more other frequency bands.

Another example apparatus of any previous example apparatus further includes an integrated structural tank circuit including a metal stub and a dielectric-filled gap extending between the conductive cap section and the conductive bezel section and a conductive inductor element formed as a conductive trace extending between the conductive cap section and the conductive bezel section.

An example electronic device includes a conductive cap section including a display panel, a conductive bezel section forming a perimeter outside the conductive cap section and separated from the conductive cap section by a bezel gap, and a conductive ground plane section forming a perimeter and being positioned opposite the conductive cap section and the conductive bezel section. The conductive ground plane section is separated from the conductive bezel section by a perimeter gap. One or more components including at least a printed circuit board and a battery residing between the conductive bezel section and the conductive ground plane section form a resonant cavity including a ground plane resonant cavity portion between the one or more components and the conductive ground plane section and a substantially annular resonant cavity portion between the one or more components and the perimeters of the conductive bezel section and the conductive ground plane section.

Another example electronic device of any previous example electronic device further includes one or more bezel slot gap shorts spanning the bezel gap to connect the conductive cap section to the conductive bezel section and forming one or more bezel slots between the conductive cap section and the conductive bezel section.

Another example electronic device of any previous example electronic device further includes two or more perimeter slot gap shorts spanning the perimeter gap to connect the conductive bezel section to the conductive ground plane section and forming one or more perimeter slots between the conductive bezel section and the conductive ground plane section.

Another example electronic device of any previous example electronic device further includes one or more bezel slot gap shorts spanning the bezel gap to connect the conductive cap section to the conductive bezel section and forming one or more bezel slots between the conductive cap section and the conductive bezel section, and two or more perimeter slot gap shorts spanning the perimeter gap to connect the conductive bezel section to the conductive ground plane section and forming one or more perimeter slots between the conductive bezel section and the conductive ground plane section. Each bezel slot gap short is radially aligned with a perimeter slot gap short. At least one perimeter slot gap short is longer than at least one aligned bezel slot gap short.

Another example electronic device of any previous example electronic device wherein the electronic device provides at least a dual frequency band antenna operation and further comprises a single feed structure.

Another example electronic device of any previous example electronic device further including a single radio frequency feed structure connecting the printed circuit board to the conductive bezel section.

Another example electronic device of any previous example electronic device further including a single radio frequency feed structure connecting the conductive cap section to the conductive bezel section.

Another example electronic device of any previous example electronic device further including an integrated structural tank circuit including a metal stub and a dielectric-filled gap extending between the conductive cap section and the conductive bezel section and a conductive inductor element formed as a conductive trace extending between the conductive cap section and the conductive bezel section.

Another example electronic device includes a conductive cap section including a display panel, a conductive bezel section forming a perimeter outside the conductive cap section and separated from the conductive cap section by a bezel gap, and a conductive ground plane section forming a perimeter and being positioned opposite the conductive cap section and the conductive bezel section. The conductive ground plane section is separated from the conductive bezel section by a perimeter gap. An integrated structural tank circuit including a metal stub and a dielectric-filled gap extends between the conductive cap section and the conductive bezel section and a conductive inductor element formed as a conductive trace extends between the conductive cap section and the conductive bezel section. One or more components including at least a printed circuit board and a battery residing between the conductive bezel section and the conductive ground plane section form a resonant cavity including a ground plane resonant cavity portion between the one or more components and the conductive ground plane section and a substantially annular resonant cavity portion between the one or more components and the perimeters of the conductive bezel section and the conductive ground plane section.

In some implementations, structures in the antenna design may include or be supplemented with materials and/or connections having electrically variable impedance to provide a capability for tuning the antenna design for different frequency bands.

The described and contemplated implementation is a matter of choice, dependent on the performance requirements of the computer system implementing the invention. Furthermore, it should be understood that operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. Apparatus comprising:
   a conductive cap section;
   a conductive bezel section forming a perimeter outside the conductive cap section and separated from the conductive cap section by a bezel gap;
   a conductive ground plane section forming a perimeter and being positioned opposite the conductive cap section and the conductive bezel section, the conductive ground plane section being separated from the conductive bezel section by a perimeter gap; and
   one or more components residing within the conductive bezel section and the conductive ground plane section forming a resonant cavity including a ground plane resonant cavity portion between the one or more components and the conductive ground plane section and another resonant cavity portion between the one or more components and the perimeters of the conductive bezel section and the conductive ground plane section.

2. The apparatus of claim 1 further comprising:
   one or more bezel slot gap shorts spanning the bezel gap to connect the conductive cap section to the conductive bezel section and forming one or more bezel slots between the conductive cap section and the conductive bezel section.

3. The apparatus of claim 1 further comprising:
   two or more perimeter slot gap shorts spanning the perimeter gap to connect the conductive bezel section to the conductive ground plane section and forming one or more perimeter slots between the conductive bezel section and the conductive ground plane section.

4. The apparatus of claim 1 further comprising:
   one or more bezel slot gap shorts spanning the bezel gap to connect the conductive cap section to the conductive bezel section and forming one or more bezel slots between the conductive cap section and the conductive bezel section, and two or more perimeter slot gap shorts spanning the perimeter gap to connect the conductive bezel section to the conductive ground plane section and forming one or more perimeter slots between the conductive bezel section and the conductive ground plane section, each bezel slot gap short being radially aligned with a perimeter slot gap short, at least one perimeter slot gap short being longer than at least one aligned bezel slot gap short.

5. The apparatus of claim 1 further wherein the apparatus provides at least a dual frequency band antenna operation and further comprises a single feed structure.

6. The apparatus of claim 1 wherein the one or more components includes a printed circuit board and further comprising:
   a single radio frequency feed structure connecting the printed circuit board to the conductive bezel section.

7. The apparatus of claim 1 further comprising:
   a single radio frequency feed structure connecting the conductive cap section to the conductive bezel section.

8. The apparatus of claim 1 further wherein the one or more components includes a printed circuit board and a battery.

9. The apparatus of claim 1 wherein the apparatus directs a radio frequency carrier wave away from the conductive ground plane section.

10. The apparatus of claim 1 further comprising:
    a tank circuit connecting between the conductive cap section and the conductive bezel section, the tank circuit providing a short circuit condition between the conductive cap section and the conductive bezel section at a first frequency band and a non-short circuit condition between the conductive cap section and the conductive bezel section at one or more other frequency bands.

11. The apparatus of claim 1 further comprising:
    an integrated structural tank circuit including a metal stub and a dielectric-filled gap extending between the conductive cap section and the conductive bezel section and a conductive inductor element formed as a conductive trace extending between the conductive cap section and the conductive bezel section.

12. An electronic device comprising:
    a conductive cap section including a display panel;
    a conductive bezel section forming a perimeter outside the conductive cap section and separated from the conductive cap section by a bezel gap;
    a conductive ground plane section forming a perimeter and being positioned opposite the conductive cap section and the conductive bezel section, the conductive ground plane section being separated from the conductive bezel section by a perimeter gap; and
    one or more components including at least a printed circuit board and a battery residing within the conductive bezel section and the conductive ground plane section forming a resonant cavity including a ground plane resonant cavity portion between the one or more components and the conductive ground plane section and a substantially annular resonant cavity portion between the one or more components and the perimeters of the conductive bezel section and the conductive ground plane section.

13. The electronic device of claim 12 further comprising:
one or more bezel slot gap shorts spanning the bezel gap to connect the conductive cap section to the conductive bezel section and forming one or more bezel slots between the conductive cap section and the conductive bezel section.

14. The electronic device of claim 12 further comprising:
two or more perimeter slot gap shorts spanning the perimeter gap to connect the conductive bezel section to the conductive ground plane section and forming one or more perimeter slots between the conductive bezel section and the conductive ground plane section.

15. The electronic device of claim 12 further comprising:
one or more two bezel slot gap shorts spanning the bezel gap to connect the conductive cap section to the conductive bezel section and forming one or more bezel slots between the conductive cap section and the conductive bezel section, and two or more perimeter slot gap shorts spanning the perimeter gap to connect the conductive bezel section to the conductive ground plane section and forming one or more perimeter slots between the conductive bezel section and the conductive ground plane section, each bezel slot gap short being radially aligned with a perimeter slot gap short, at least one perimeter slot gap short being longer than at least one aligned bezel slot gap short.

16. The electronic device of claim 12 further wherein the electronic device provides at least a dual frequency band antenna operation and further comprises a single feed structure.

17. The electronic device of claim 12 wherein further comprising:
a single radio frequency feed structure connecting the printed circuit board to the conductive bezel section.

18. The electronic device of claim 12 further comprising:
a single radio frequency feed structure connecting the conductive cap section to the conductive bezel section.

19. The electronic device of claim 12 further comprising:
an integrated structural tank circuit including a metal stub and a dielectric-filled gap extending between the conductive cap section and the conductive bezel section and a conductive inductor element formed as a conductive trace extending between the conductive cap section and the conductive bezel section.

20. An electronic device comprising:
a conductive cap section including a display panel;
a conductive bezel section forming a perimeter outside the conductive cap section and separated from the conductive cap section by a bezel gap;
a conductive ground plane section forming a perimeter and being positioned opposite the conductive cap section and the conductive bezel section, the conductive ground plane section being separated from the conductive bezel section by a perimeter gap;
an integrated structural tank circuit including a metal stub and a dielectric-filled gap extending between the conductive cap section and the conductive bezel section and a conductive inductor element formed as a conductive trace extending between the conductive cap section and the conductive bezel section; and
one or more components including at least a printed circuit board and a battery residing within the conductive bezel section and the conductive ground plane section forming a resonant cavity including a ground plane resonant cavity portion between the one or more components and the conductive ground plane section and a substantially annular resonant cavity portion between the one or more components and the perimeters of the conductive bezel section and the conductive ground plane section.

\* \* \* \* \*